(12) United States Patent
Kubo

(10) Patent No.: US 7,342,865 B2
(45) Date of Patent: Mar. 11, 2008

(54) OBJECTIVE LENS FOR OPTICAL RECORDING/REPRODUCING DEVICE

(75) Inventor: Wataru Kubo, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 405 days.

(21) Appl. No.: 10/718,723

(22) Filed: Nov. 24, 2003

(65) Prior Publication Data

US 2004/0105376 A1    Jun. 3, 2004

(30) Foreign Application Priority Data

Nov. 29, 2002    (JP)    ............... 2002-346730

(51) Int. Cl.
*G11B 7/00*    (2006.01)
(52) U.S. Cl. .................. 369/103; 369/112.23
(58) Field of Classification Search ............ None
See application file for complete search history.

(56) References Cited

U.S. PATENT DOCUMENTS

| | | | |
|---|---|---|---|
| 4,269,478 A * | 5/1981 | Maeda et al. ............ | 359/764 |
| 5,173,809 A | 12/1992 | Iwaki et al. ............ | 359/784 |
| 5,600,494 A | 2/1997 | Kubo et al. ............ | 359/719 |
| 5,889,748 A * | 3/1999 | Shimano et al. ........ | 369/112.26 |
| 6,847,498 B2 * | 1/2005 | Curtis et al. ............ | 359/796 |
| 6,885,510 B2 * | 4/2005 | Hoogland et al. ...... | 359/793 |
| 2003/0156334 A1 | 8/2003 | Maruyama ............ | 359/719 |

FOREIGN PATENT DOCUMENTS

| | | |
|---|---|---|
| JP | S56-50247 | 11/1981 |
| JP | H11-133297 | 5/1999 |

\* cited by examiner

*Primary Examiner*—William Korzuch
*Assistant Examiner*—Christopher Lamb
(74) *Attorney, Agent, or Firm*—Greenblum & Bernstein, P.L.C.

(57) ABSTRACT

There is provided an objective lens which has positive refractive power and has a single lens element having an incident surface from which the collimated beam enters and an exit surface from which the collimated beam emerges. Further, the incident surface and the exit surface are configured to be rotationally symmetrical aspherical surfaces. At least within an effective diameter of the single lens element, the incident surface and the exit surface are symmetrical with respect to a plane perpendicular to an optical axis of the single lens element and have the same shape.

5 Claims, 27 Drawing Sheets

SPHERICAL ABERRATION
SINE CONDITION

ASTIGMATISM

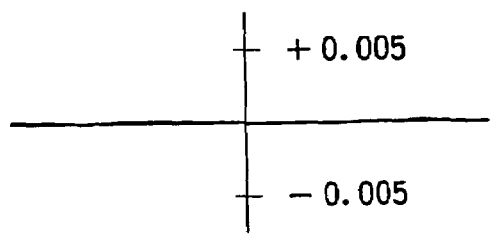
FIG.5A  Y= 0.00
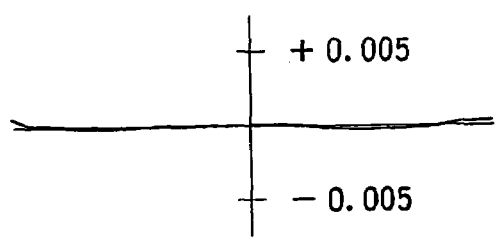
FIG.5B  Y= 0.02 (W= 1.30 )
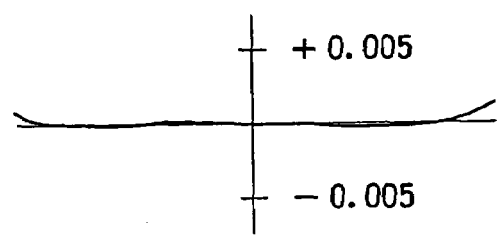
FIG.5C  Y= 0.05 (W= 2.70 )
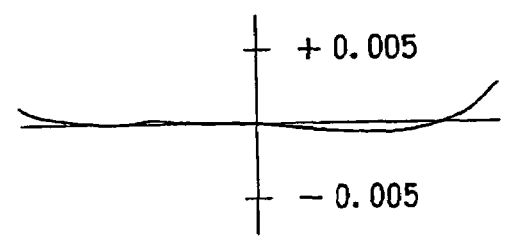
FIG.5D  Y= 0.07 (W= 4.00 )

FIG.6A  Y= 0.00
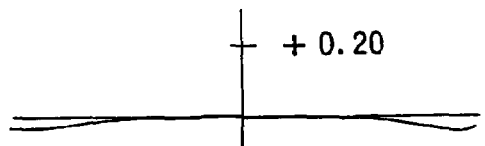
FIG.6B  Y= 0.02 (W= 1.30)
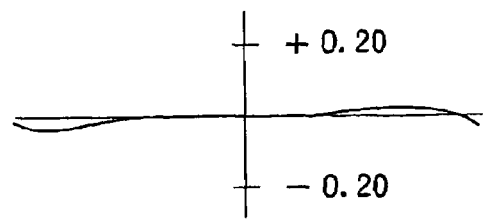
FIG.6C  Y= 0.05 (W= 2.70)
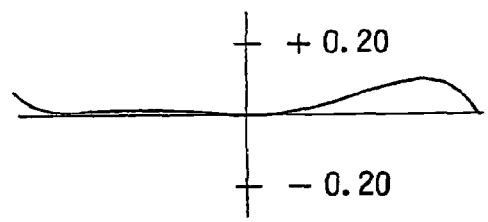
FIG.6D  Y= 0.07 (W= 4.00)
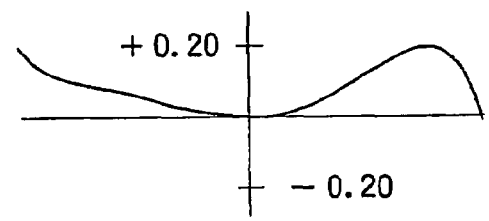
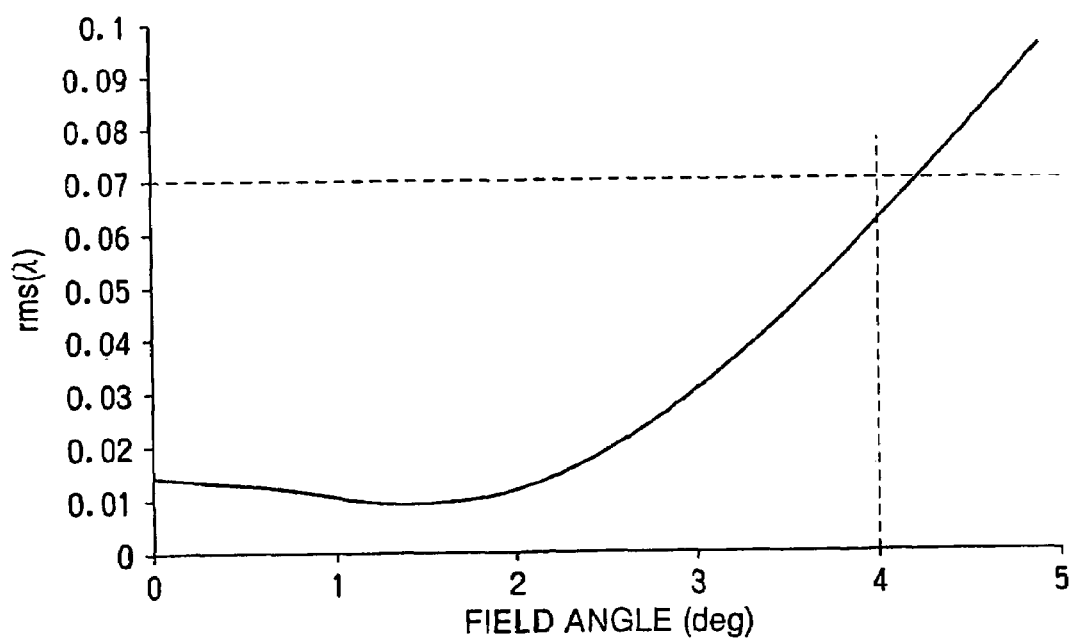
FIG. 7

SPHERICAL ABERRATION
SINE CONDITION

ASTIGMATISM

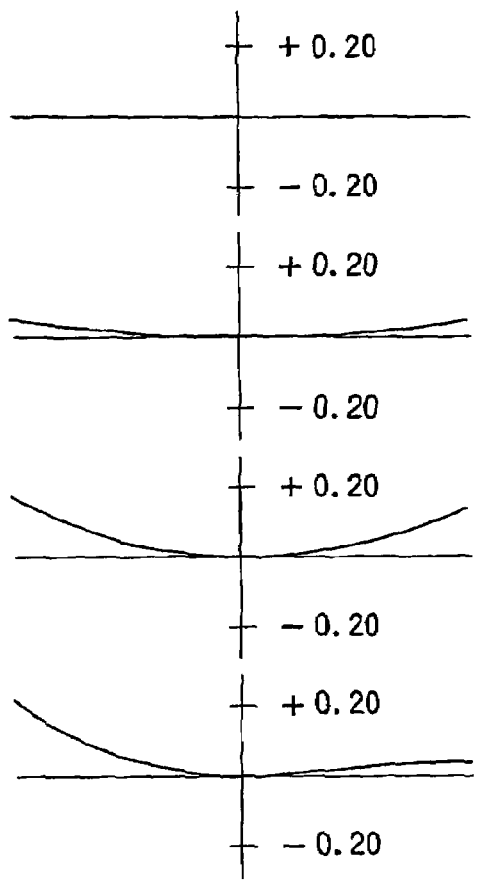
FIG.11A  Y= 0.00
FIG.11B  Y= 0.15 (W= 8.50 )
FIG.11C  Y= 0.29 (W=17.00 )
FIG.11D  Y= 0.43 (W=25.50 )
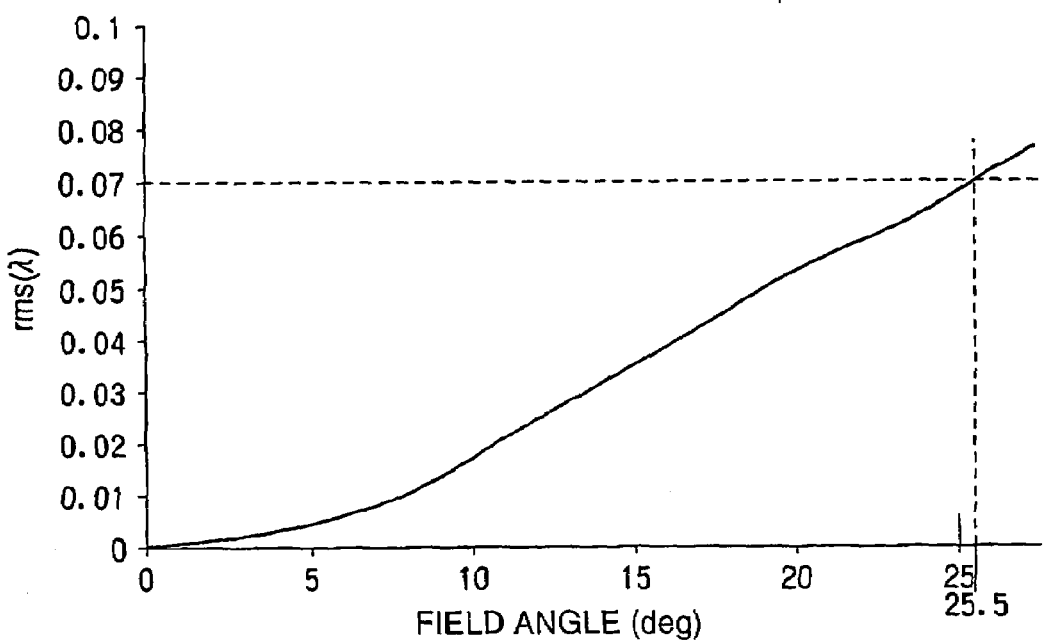
FIG.12

SPHERICAL ABERRATION
SINE CONDITION

ASTIGMATISM

Y= 0.00

Y= 0.02
(W= 1.30 )

Y= 0.05
(W= 2.70 )

Y= 0.07
(W= 4.00 )

SPHERICAL ABERRATION
SINE CONDITION

ASTIGMATISM

Y= 0.00

Y= 0.14
(W= 7.90)

Y= 0.27
(W=15.70)

Y= 0.40
(W=23.60)

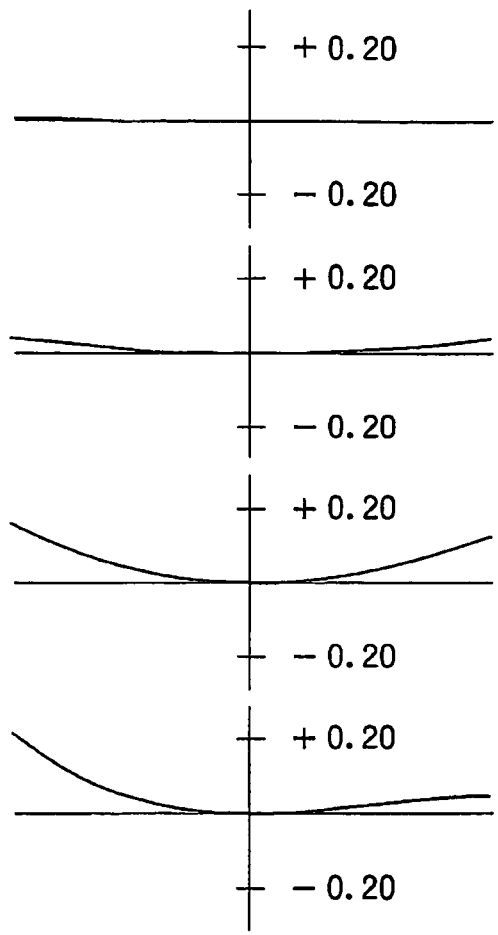
FIG. 23A Y= 0.00
FIG. 23B Y= 0.14 (W= 7.90)
FIG. 23C Y= 0.27 (W=15.70)
FIG. 23D Y= 0.40 (W=23.60)
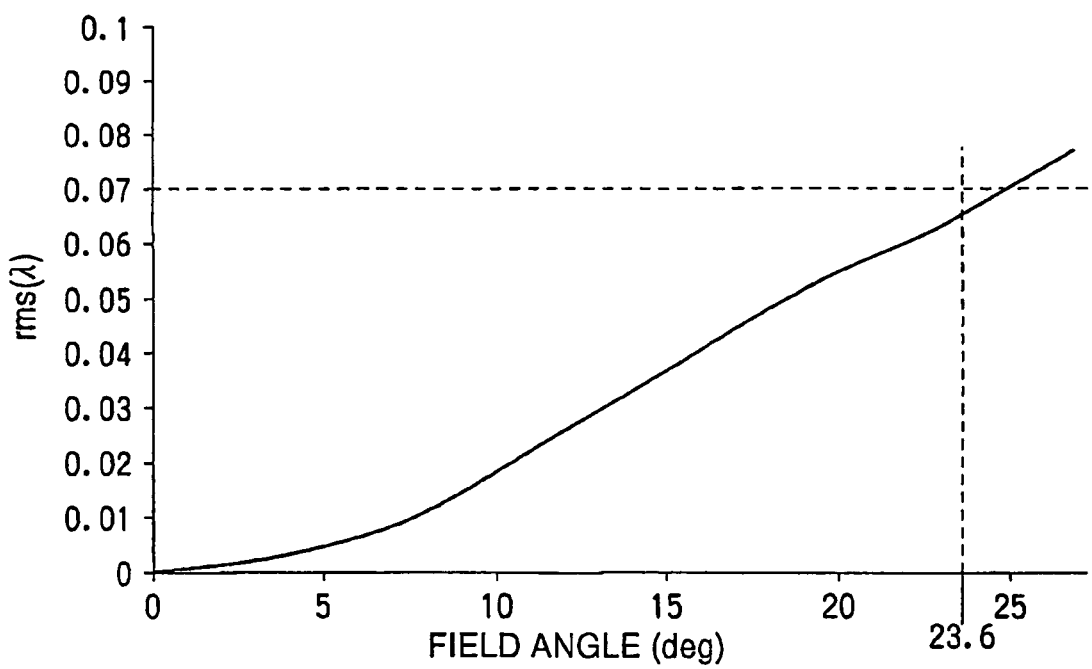
FIG. 24

ASTIGMATISM

Y= 0.00
FIG.31A
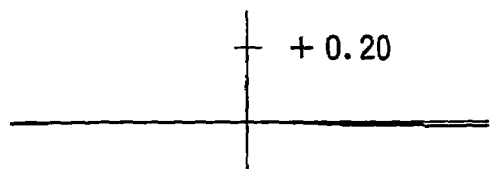
Y= 0.05
(W= 3.10)
FIG.31B
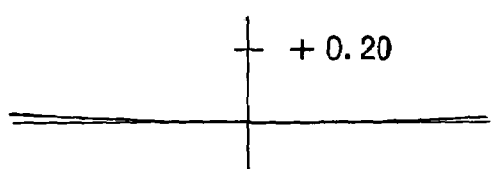
Y= 0.11
(W= 6.10)
FIG.31C
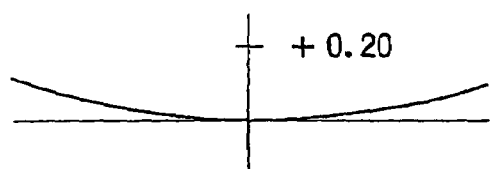
Y= 0.16
(W= 9.20)
FIG.31D
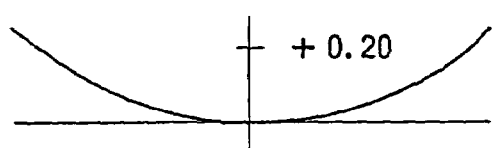
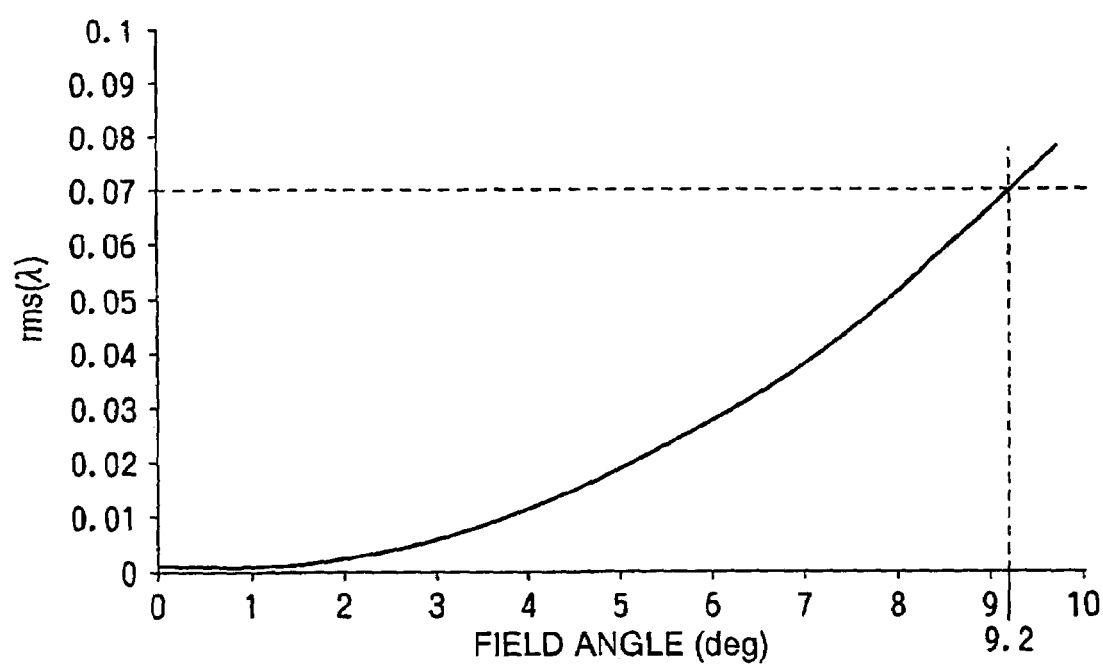
FIG.32

SPHERICAL ABERRATION
SINE CONDITION

FIG.37
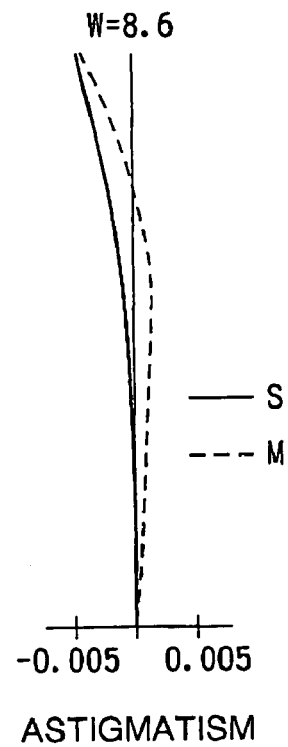
ASTIGMATISM
FIG.38A
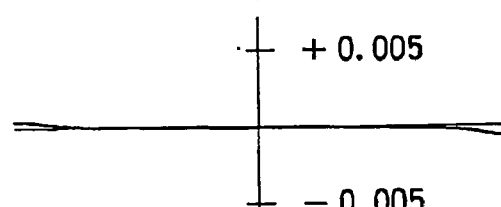
Y= 0.00
FIG.38B
Y= 0.05
(W= 2.90 )
FIG.38C
Y= 0.10
(W= 5.80 )
FIG.38D
Y= 0.15
(W= 8.60 )
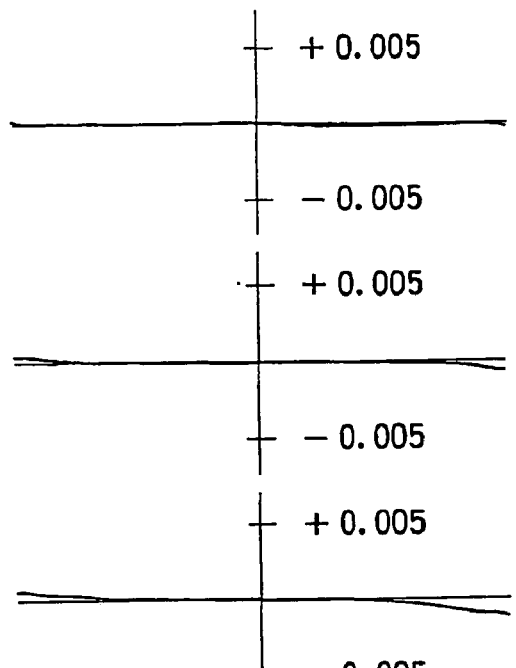

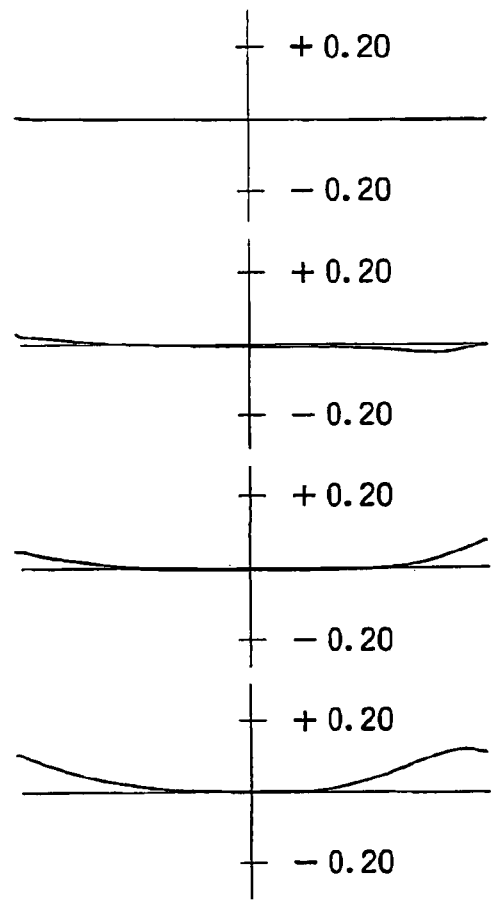
FIG.39A Y= 0.00
FIG.39B Y= 0.05 (W= 2.90)
FIG.39C Y= 0.10 (W= 5.80)
FIG.39D Y= 0.15 (W= 8.60)
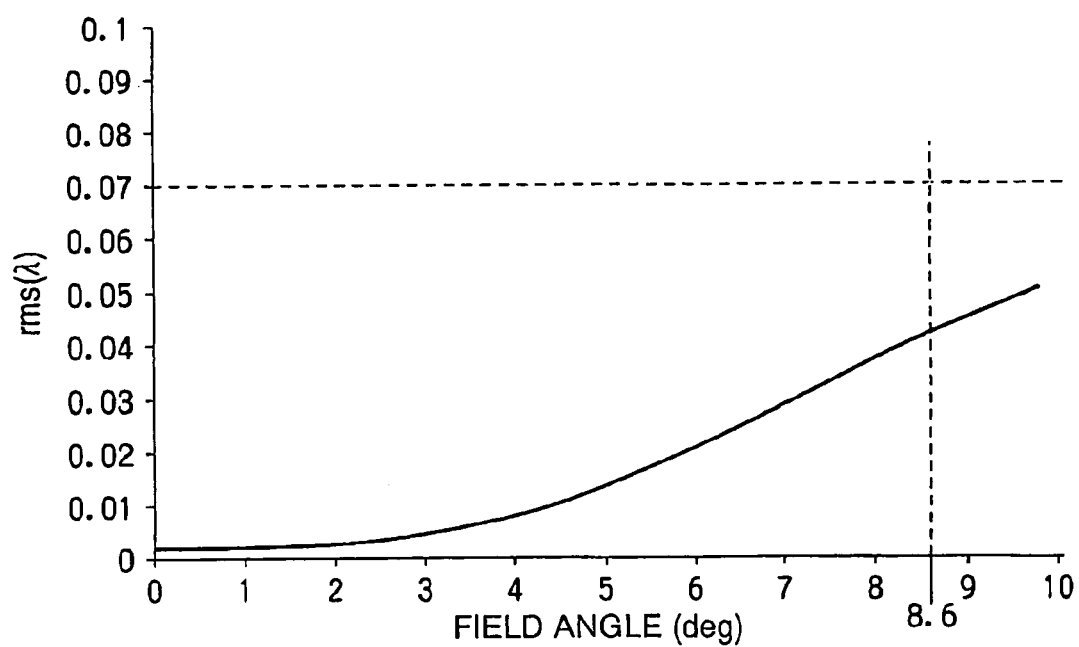
FIG.40

ASTIGMATISM

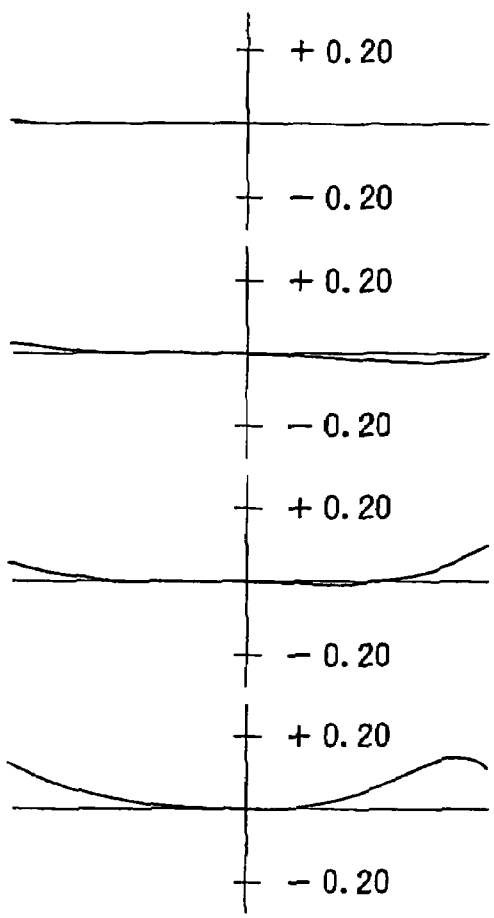
FIG. 47A  Y= 0.00
FIG. 47B  Y= 0.05 (W= 2.90)
FIG. 47C  Y= 0.10 (W= 5.80)
FIG. 47D  Y= 0.15 (W= 8.60)
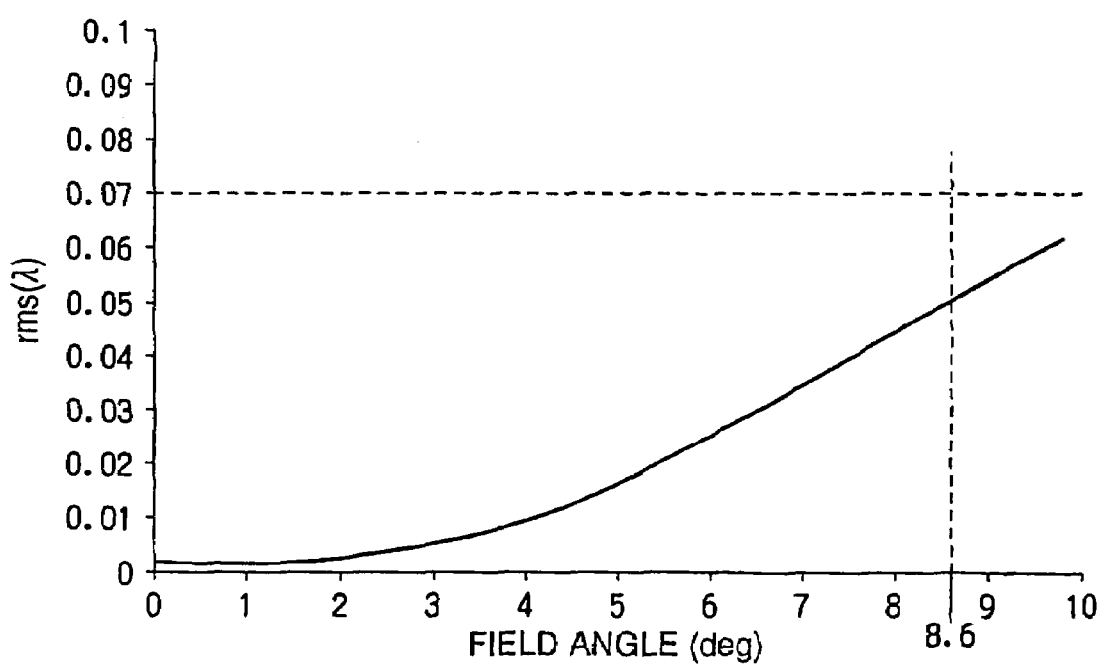
FIG. 48

OBJECTIVE LENS FOR OPTICAL RECORDING/REPRODUCING DEVICE

BACKGROUND OF THE INVENTION

The present invention relates to an objective lens used for an optical recording/reproducing device that is capable of recording/reproducing large amounts of optical information to/from hologram recording medium.

Recently, such optical recording/reproducing devices using hologram recording medium are in practical use. Features of the optical recording/reproducing device using hologram recording medium are: the device can employ an optical pick-up widely used for optical disc apparatuses which use optical discs such as a CD, a CD-R and a DVD; the device can employ a servo mechanism widely used for the optical disc apparatuses; and the device uses the hologram recording medium. Hereafter, a hologram recording medium having a form of a disc or a card is referred to as a hologram disc.

The objective lens mounted on the optical pick-up provided in the optical recording/reproducing device using the hologram disc is required to be sufficiently corrected for wavefront aberration for a beam from a light source and for a beam reflected from the hologram disc.

A fourier transform lens is known as a lens which is sufficiently corrected for wavefront aberration for a beam entering from a incident surface thereof (a light source side surface) and for a beam entering from an exit surface thereof (a recording media side surface).

Japanese Provisional Publication No. HEI11-133297 discloses a fourier transform lens having a plurality of lenses. Since the fourier transform lens disclosed in the above mentioned publication has the plurality of lenses, if the fourier transform lens is attached to the optical pick-up employed by the optical disc apparatus, the following problems arise.

Firstly, since the fourier transform lens has the plurality of lenses, position adjustments of the plurality of lenses are required. This is troublesome for a worker. Secondly, additional design of a lens frame for holding of the fourier transform lens is required because the fourier transform lens can not be attached to a lens frame mounted on an actuator of the optical pick-up employed by the optical disc apparatus. Use of a new lens frame suitable for the fourier transform lens having the plurality of lenses increases a size of the optical recording/reproducing device.

Accordingly, the objective lens for the optical recording/reproducing device for the hologram disc is required to be a single lens as in the case of the optical disc apparatus.

SUMMARY OF THE INVENTION

The present invention is advantageous in that it provides an objective lens suitable for an optical recording/reproducing device for the hologram disc.

According to an aspect of the present invention, there is provided an objective lens for an optical recording/reproducing device which records/reproduces information to/from a recording medium utilizing holography. The objective lens converges a collimated beam in the vicinity of a recording surface of the recording medium to record/reproduce the information. The objective lens has a single lens element having an incident surface to which the collimated beam enters and an exit surface being opposite to said incident surface. Further, the incident surface and the exit surface are configured to be rotationally symmetrical aspherical surfaces. At least within an effective diameter of the single lens element, the incident surface and the exit surface are symmetrical with respect to a plane perpendicular to an optical axis of the single lens element and have the same shape. The single lens element has positive refractive power.

With this configuration, although the objective lens is configured as a single lens, the objective lens has sufficiently corrected aberrations and has high performance as the fourier transform lens. Accordingly, the objective lens which is suitable for recording/reproducing information to/from the hologram disc is provided.

Further, since the objective lens is a single lens element, installation of the objective lens on the optical recording/reproducing device is easy. Further, sufficient working distance WD between the objective lens and a cover layer of the recording medium such as the hologram disc can be attained. Since each of an object point and an image point are sufficiently away from the objective lens, objects and images with respect to the objective lens can be positioned with a high degree of flexibility in the optical recording/reproducing device.

Optionally, the rotationally symmetrical aspherical surface of each of the two refractive surfaces may be expressed by a formula (1) below:

$$F(h) = \frac{\frac{h^2}{r}}{1+\sqrt{1-(1+K)\left(\frac{1}{r}\right)^2 h^2}} + A_4 h^4 + A_6 h^6 + A_8 h^8 + A_{10} h^{10} \quad (1)$$

where F(h) is a sag amount (i.e., a distance from a plane, which is tangential to the rotationally symmetrical aspherical surface at the optical axis, to the rotationally symmetrical aspherical surface at a position whose height with respect to the optical axis is h), r is a radius of curvature of the rotationally symmetrical aspherical surface at the optical axis, K is a conical coefficient, and $A_4$-$A_{10}$ are fourth, sixth, eighth, and tenth order aspherical coefficients, respectively. In this case, a first derivative of the sag amount F(h) with respect to h may satisfy a condition (2) and a second derivative of the sag amount F(h) with respect to h may satisfy a condition (3):

$$-0.35 \leq dF(h)/dh \leq +0.35 \quad (2)$$

$$+0.3 \leq d^2F(h)/d^2h \leq +1.3 \quad (3).$$

If the conditions (2) and (3) are satisfied, spherical aberration and a coma (i.e., a sine condition) are effectively reduced. Therefore, an RMS value of wavefront aberration can be reduced lower than or equal to Marechal criterion (0.07 λrms).

Still optionally, the objective lens may satisfy a condition (4):

$$0.9 \leq r/tc \leq 1.5 \quad (4)$$

where r represents the radius of curvature on the optical axis, and tc represents a central lens thickness of the objective lens.

By satisfying the condition (4), astigmatism of the objective lens can be sufficiently reduced. Further, the above mentioned high optical performance which is required for the fourier transform lens can be maintained within the whole range of a required field angle.

In a particular case, an image height y of an image formed by the objective lens may be defined by the following equation (5):

$$y = f \sin W \tag{5}$$

where f represents a focal length of the objective lens and W represents a field angle. In this case, with regard to each of a beam entering from the incident surface and a beam entering from the exit surface, an entrance pupil plane coincides with a front focal point and an image point coincides with a back focal point.

In a particular case, with regard to each of a beam entering from the incident surface and a beam entering from the exit surface, the objective lens may have wavefront aberration performance less than or equal to Marechal criterion within a maximum field angle range.

Optionally, half of the maximum field angle may be larger than or equal to 3°.

BRIEF DESCRIPTION OF THE ACCOMPANYING DRAWINGS

FIGS. 5A-5D are graphs showing transverse aberrations of the objective lens of the first example with regard to the beam entering from the incident surface;

FIGS. 6A-6D are graphs showing the wavefront aberrations of the objective lens of the first example with regard to the beam entering from the incident surface;

FIG. 7 is a graph showing a relationship between an RMS value of wavefront aberration and a field angle of the first example with regard to the beam entering from the incident surface;

FIGS. 11A-11D are graphs showing the wavefront aberrations of the objective lens of the first example with regard to the beam entering from the exit surface;

FIG. 12 is a graph showing a relationship between an RMS value of the wavefront aberration and the field angle of the first example with regard to the beam entering from the exit surface;

FIGS. 23A-23D are graphs showing the wavefront aberrations of the objective lens of the second example with regard to the beam entering from the exit surface;

FIG. 24 is a graph showing a relationship between an RMS value of the wavefront aberration and the field angle of the second example with regard to the beam entering from the exit surface;

FIGS. 31A-31D are graphs showing the wavefront aberrations of the objective lens of the third example;

FIG. 32 is a graph showing a relationship between an RMS value of the wavefront aberration and the field angle of the third example;

FIG. 37 is a graph showing astigmatism of the objective lens of the fourth example;

FIGS. 38A-38D are graphs showing transverse aberrations of the objective lens of the fourth example;

FIGS. 39A-39D are graphs showing the wavefront aberrations of the objective lens of the fourth example;

FIG. 40 is a graph showing a relationship between an RMS value of the wavefront aberration and the field angle of the fourth example;

FIGS. 47A-47D are graphs showing the wavefront aberrations of the objective lens of the fifth example;

FIG. 48 is a graph showing a relationship between an RMS value of the wavefront aberration and the field angle of the fifth example.

DETAILED DESCRIPTION OF THE EMBODIMENTS

Hereinafter, an embodiment according to the invention is described with reference to the accompanying drawings.

Figure 1:
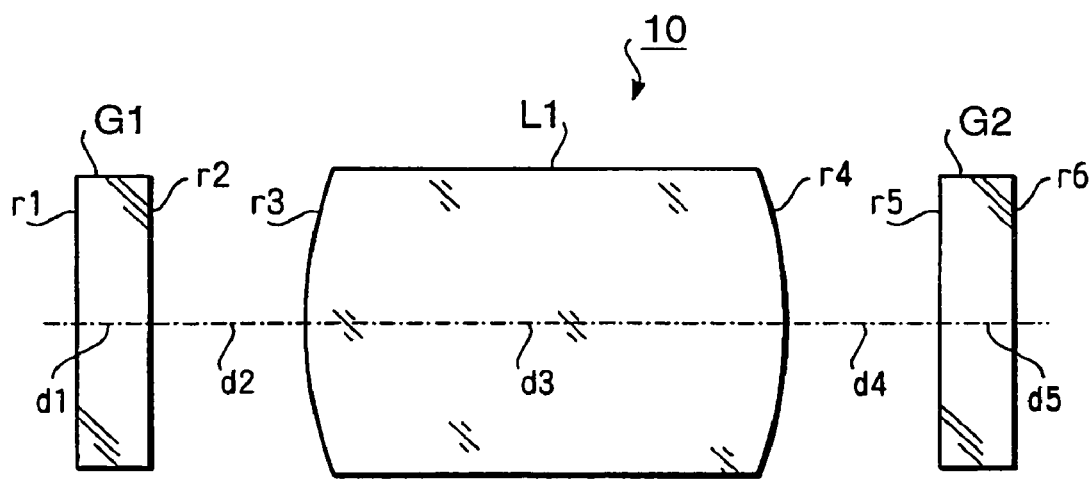
FIG. 1 shows an objective optical system having an objective lens according to an embodiment of the invention.

FIG. 1 shows an objective optical system 10 having an objective lens L1 according to the embodiment of the invention. The objective lens L1 is specifically targeted for an optical recording/reproducing device for hologram recording media. The objective lens L1 is mounted on an actuator provided in the optical recording/reproducing device for hologram recording media. On FIG. 1 (and FIGS. 26, 34 and 42), the left side is a light source side, and the right side is a recording medium side.

The objective lens L1 has an incident surface r3 from which a beam from a light source enters and an exit surface r4 from which a beam reflected from the recording medium enters. The incident surface r3 and the exit surface r4 are configured as rotationally symmetrical aspherical surfaces having shapes equal to each other and having the same radius of curvature. That is, the incident surface r3 and the exit surface r4 are symmetrical with respect to a plane perpendicular to an optical axis of the objective lens L1.

An image height y of an image formed by the objective lens L1 is defined by the following equation (5):

$$y = f \sin W \quad (5)$$

where f represents a focal length of the objective lens L1 and W represents a field angle. The objective lens L1 substantially satisfies a sine condition with regard to both collimated beams entering from the incident surface r3 and entering from the exit surface r4. With regard to the objective lens L1, an entrance pupil plane coincides with a front focal point and an exit pupil plane coincides with an image point. Accordingly, the objective lens L1 functions as a fourier transform lens.

A rotationally symmetrical aspherical surface is expressed by a formula (1) below:

$$F(h) = \frac{\frac{h^2}{r}}{1 + \sqrt{1 - (1+k)\left(\frac{1}{r}\right)^2 h^2}} + A_4 h^4 + A_6 h^6 + A_8 h^8 + A_{10} h^{10} \quad (1)$$

where F(h) is a sag amount (i.e., a distance from a plane, which is tangential to the aspherical surface at the optical axis, to the aspherical surface at a position whose height with respect to the optical axis is h), r is a radius of curvature of the aspherical surface at the optical axis, k is a conical coefficient, and $A_4$-$A_{10}$ are fourth, sixth, eighth, and tenth order aspherical coefficients, respectively. The formula (1) may include more than tenth order coefficients.

Each of the surfaces r3 and r4 of the objective lens L1 expressed by the formula (1) satisfies both of the following conditions (2) and (3).

$$-0.35 \leq dF(h)/dh \leq +0.35 \quad (2)$$

$$+0.3 \leq d^2F(h)/d^2h \leq +1.3 \quad (3)$$

The condition (2) defines a range of a first derivative of the sag amount F(h) with respect to h. That is, the condition (2) defines a shape of the surface r3 (r4) with regard to an inclination of the surface r3 (r4). The condition (3) defines a range of a second derivative of the sag amount F(h) with respect to h. That is, the condition (3) defines rate of change of the inclination of the surface r3 (r4).

If one or more of the conditions (2) and (3) are not satisfied, wavefront aberration deteriorates. More specifically, if dF(h)/dh gets less than the lower limit of the condition (2) or if $d^2F(h)/d^2h$ gets less than the lower limit of the condition (3), a shortage of correction for spherical aberration or the sine condition is caused. Further, in such a case, on-axis or off-axis wavefront aberration deteriorates, and therefore the wavefront aberration exceeds Marechal criterion (0.07 λrms) used as a measure for determining whether recording/reproducing operation can be performed properly.

If dF(h)/dh exceeds the upper limit of the condition (2) or if $d^2F(h)/d^2h$ exceeds the upper limit of the condition (3), correction of the sine condition becomes excessive. Further, in such a case, off-axis wavefront aberration deteriorates, and predetermined linearity of an f sin W characteristic used as a measure for an evaluation of optical performance of the fourier transform lens can not be satisfied because of excess and deficiency of correction of the sine condition.

In addition to the satisfaction of the conditions (2) and (3), the objective lens L1 satisfies a condition (4):

$$0.9 \leq r/tc \leq 1.5 \quad (4)$$

where r represents the radius of curvature on the optical axis, tc represents a central lens thickness of the objective lens L1.

If r/tc gets less than the lower limit of the condition (4) or if r/tc exceeds the upper limit of the condition (4), convergence of a off-axis meridional ray is deteriorated, and therefore astigmatism is caused. When astigmatism is caused, the wavefront aberration of the whole objective lens L1 considerably deteriorates. Further, in such a case, a range of the field angle within which the wavefront aberration becomes lower than or equal to Marechal criterion narrows with regard to both of the beam entering from the incident surface r3 and the beam entering from the exit surface r4. Further, in such a case, image transmissibility or image reproducibility used as a measure of lens performance of the fourier transform lens deteriorates.

By satisfying the above mentioned conditions (2), (3) and (4), even though the objective lens L1 is configured as a single lens, the objective lens L1 not only has high lens performance (i.e., has sufficiently reduced aberrations) but also has the function as the fourier transform lens.

Further, the objective lens L1 keeps high lens performance at high NA (numerical aperture) by properly selecting its refractive index. Preferably, if the NA is larger than or equal to 0.2, the refractive index is greater than or equal to 1.6. When the refractive index gets lower than 1.6, the shortage of correction of the spherical aberration and the sine condition is caused. In particular, a peripheral region (a region through which rays having high height pass) of the objective lens L1 falls short of the refractive power, and therefore a predetermined sine condition required for the fourier transform lens cannot be satisfied. Further, the RMS value of the wavefront aberration exceeds Marechal criterion within the whole range of the maximum field angle.

Recently, fine SLMs (Spatial Light Modulator) having pixel pitches of 10-20 μm used for recording/reproducing large amounts of information are in practical use. To use the SLM with the objective lens L1 to record/reproduce large amounts of information, the range of the field angle of the objective lens L1 is preferably larger than or equal to a diffraction angle of the first order diffracted light at the pixel pitches of the SLM. If the objective lens L1 has such configuration, first order diffracted light as well as zeroth order diffracted light can be used to record/reproduce large amounts of information, and thereby OTF (Optical transfer Function) for digital bit information is enhanced. Further, the digital bit information of the SLM, DMD (Digital Micromirror Device®) and the like can be transferred with high resolution, and therefore reproducibility in recording/reproducing information is enhanced.

A diffraction angle is defined by arc sin($\lambda$/p), where $\lambda$ represents a wavelength and p represents the pixel pitch. For example, when the wavelength $\lambda$ is 532 nm and the pixel pitch p is 10 μm, the diffraction angle of the first order diffracted light is about 3°. That is, in addition to satisfying the above mentioned conditions, the objective lens L1 is configured to have a half field angle larger than or equal to 3° and to have the wavefront aberration less than or equal to Marechal criterion within the maximum field angle.

Hereafter, five concrete numerical examples of the objective lens according to the embodiment of the present invention will be explained.

FIRST EXAMPLE

FIG. 1 shows a lens arrangement of the objective lens system 10 according to a first example of the present invention. As shown in FIG. 1, the objective lens system 10 includes an optical element G1 which is one of a cover layer of the spatial light modulator (SLM) and a plate constituting a phase shifter such as a compensator, the objective lens L1, and a plate G2 constituting a cover layer of a hologram recording medium. As described above, the surface r3 of the objective lens L1 is the incident surface, and the surface r4 is the exit surface.

TABLE 1, TABLE 2 and TABLE 3 indicate numerical structure of the objective lens system 10.

TABLE 1

| Surface No. | r | d | N | ν | Nd |
|---|---|---|---|---|---|
| #1 | ∞ | 0.200 | 1.51900 | 64.1 | 1.51633 |
| #2 | ∞ | 0.411 | | | |
| #3 | 1.325 | 1.313 | 1.85898 | 32.3 | 1.85026 |
| #4 | −1.325 | 0.411 | | | |
| #5 | ∞ | 0.200 | 1.51900 | 64.1 | 1.51633 |
| #6 | ∞ | — | | | |

TABLE 2

| | #3 | #4 |
|---|---|---|
| k | 0.0000E+00 | 0.0000E+00 |
| A4 | −0.12286E+00 | 0.12286E+00 |
| A6 | −0.13248E+00 | 0.13248E+00 |
| A8 | 0.0000E+00 | 0.0000E+00 |
| A10 | 0.0000E+00 | 0.0000E+00 |
| A12 | 0.0000E+00 | 0.0000E+00 |

TABLE 3

| | #3 | #4 |
|---|---|---|
| FNO | 1:1.2 | 1:7.1 |
| f | 1.00 | 1.00 |
| W | 4.0 | 25.5 |
| NA | 0.43 | 0.07 |

In TABLE 1, #1-#6 denote surface numbers assigned to optical surfaces in the objective lens system 10 from the beam incident side, r denotes radius of curvature on the optical axis (values of "r" of surfaces #1-#6 listed in TABLE 1 respectively correspond to surfaces indicated by reference numbers r1-r6 in FIG. 1), d denotes a distance (unit: mm) between a surface and a next surface along the optical axis (values of "d" of surfaces #1-#5 listed in TABLE 1 respectively correspond to distances indicated by reference numbers d1-d5 in FIG. 1), n denotes a refractive index at the design wavelength, ν is an Abbe number for d-ray (wavelength 587.56 nm) and nd denotes a refractive index for the d-ray.

In TABLE 1, #1 and #2 are a surface r1 and a surface r2 of the optical element G1, #3 and #4 are incident surface r3 and the exit surface r4 of the objective lens L1, and #5 and #6 are a surface r5 and a surface r6 of the plate G2.

The conical coefficient and the aspherical coefficients defining the rotational symmetrical aspherical surfaces #3 and #4 of the objective lens L1 are indicated in TABLE 2.

As shown in TABLE 1 and TABLE 2, the surfaces #3 and #4 are symmetrical with respect to a plane perpendicular to the optical axis of the objective lens L1. However, the field angle of the objective lens L1 for the beam entering from the incident surface (#3) and the field angle for the beam entering from the exit surface (#4) are different from each other. Further, a diameter of the entrance pupil of the objective lens L1 for the beam entering from the incident surface (#3) and a diameter of the entrance pupil of the objective lens L1 for the beam entering from the exit surface (#4) are different from each other.

In TABLE 3, F numbers (FNO), focal lengths, field angles W, numerical apertures NA for a collimated beam entering from the incident surface r3 (#3) and for a collimated beam entering from the exit surface r4 (#4) are indicated. As shown in TABLE 3, with regard to the collimated beam entering from the incident surface r3 (#3) (i.e., the collimated beam from the light source), the objective lens L1 provides a larger NA (0.43), and thereby the objective lens L1 enables to record/reproduce high definition optical information. With regard to the beam entering from the exit surface r4 (#4) (i.e., the beam returning from the recording media), the objective lens L1 accomplishes a high field angle, and thereby the objective lens L1 enables to reproduce hologram information from the recording medium with high resolution and high contrast.

As is well known, the recording medium having high density address information which enables to randomly access the recording media have been provided. Since the objective lens L1 provides high numerical aperture for the beam entering from the incident surface r3 (#3), the objective lens L1 has sufficient optical performance for resolving the high density address information.

Figure 2:
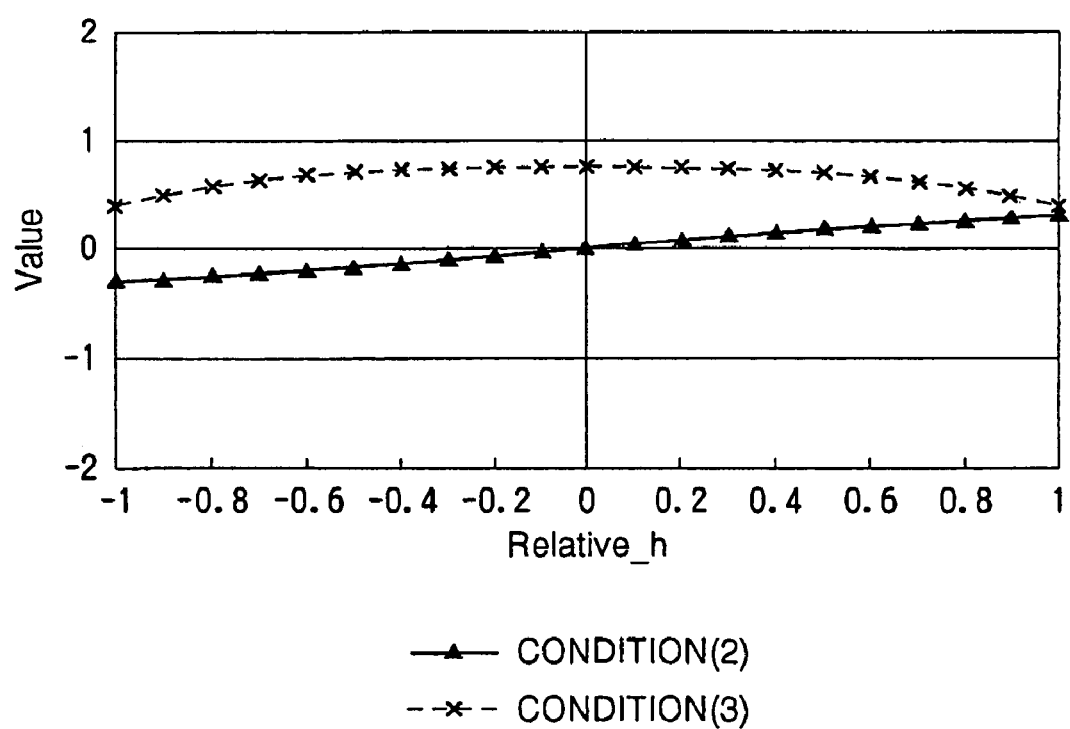
FIG. 2 is a graph illustrating values of conditions (2) and (3) of an objective lens of a first example of the embodiment.

FIG. 2 is a graph illustrating values of the conditions (2) and (3) which define the shape of the surface r3 (r4) of the objective lens L1. In FIG. 2, a horizontal axis represents a height h from the optical axis, a vertical axis represents a value of each of the conditions (2) and (3). The horizontal axis represents a relative height when the maximum height is represented by 1. In FIG. 2, a solid curved line which passes through small triangles represents values of dF(h)/dh, a broken curved line which passes through small crosses represents values of $d^2F(h)/d^2h$.

TABLE 4 shows numerical data of the formula (1) and the conditions (2) and (3) of the first example. Since the surface r3 (#3) and the surface r4 (#4) have the same shape, both of surface r3 (#3) and the surface r4 (#4) take numerical data indicated in TABLE 4.

TABLE 4

| | | Surface #3 (#4) | | |
| --- | --- | --- | --- | --- |
| Relative h | h [mm] | formula (1) F(h) | Condition (2) dF(h)/dh | Condition (3) $d^2F(h)/d^2h$ |
| 1 | 0.474 | 8.806E−02 | 0.31183 | 0.39524 |
| 0.9 | 0.4266 | 7.075E−02 | 0.29077 | 0.48968 |
| 0.8 | 0.3792 | 5.552E−02 | 0.26572 | 0.56400 |
| 0.7 | 0.3318 | 4.226E−02 | 0.23757 | 0.62145 |
| 0.6 | 0.2844 | 3.090E−02 | 0.20703 | 0.66500 |
| 0.5 | 0.237 | 2.138E−02 | 0.17470 | 0.69728 |
| 0.4 | 0.1896 | 1.364E−02 | 0.14107 | 0.72055 |
| 0.3 | 0.1422 | 7.654E−03 | 0.10651 | 0.73668 |
| 0.2 | 0.0948 | 3.396E−03 | 0.07132 | 0.74714 |
| 0.1 | 0.0474 | 8.483E−04 | 0.03575 | 0.75300 |
| 0 | 0 | 0 | 0 | 0.75488 |
| −0.1 | −0.0474 | 8.483E−04 | −0.03575 | 0.75300 |
| −0.2 | −0.0948 | 3.396E−03 | −0.07132 | 0.74714 |
| −0.3 | −0.1422 | 7.654E−03 | −0.10651 | 0.73668 |
| −0.4 | −0.1896 | 1.364E−02 | −0.14107 | 0.72055 |
| −0.5 | −0.237 | 2.138E−02 | −0.17470 | 0.69728 |
| −0.6 | −0.2844 | 3.090E−02 | −0.20703 | 0.66500 |
| −0.7 | −0.3318 | 4.226E−02 | −0.23757 | 0.62145 |
| −0.8 | −0.3792 | 5.552E−02 | −0.26572 | 0.56400 |
| −0.9 | −0.4266 | 7.075E−02 | −0.29077 | 0.48968 |
| −1 | −0.474 | 8.806E−02 | −0.31183 | 0.39524 |

Optical performance of the objective lens L1 will be explained. FIGS. 3-7 are graphs showing optical performance of the objective lens L1 with regard to the beam entering from the incident surface r3. FIGS. 8-12 are graphs showing optical performance of the objective lens L1 with regard to the beam entering from the exit surface r4.

Figure 3:
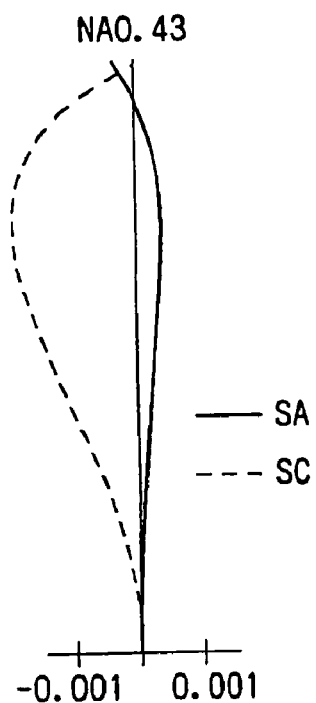
FIG. 3 is a graph showing spherical aberration and a sine condition of the objective lens of the first example with regard to a beam entering from an incident surface.

FIG. 3 is a graph showing the spherical aberration and the sine condition of the objective lens L1 with regard to the beam entering from the incident surface r3. In FIG. 3 (and the following drawings showing spherical aberrations), a horizontal axis represents positions in a direction of the optical axis (unit: mm), a vertical axis represents a height h from the optical axis (unit: mm), a solid curved line SA represents the spherical aberration, and a curved broken line SC represents the sine condition.

Figure 4:
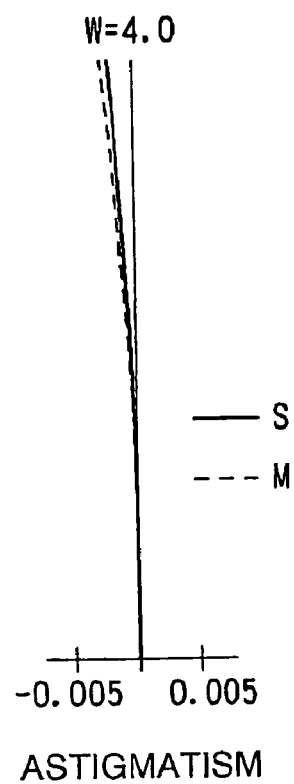
FIG. 4 is a graph showing astigmatism of the objective lens of the first example with regard to the beam entering from the incident surface.

FIG. 4 is a graph showing astigmatism of the objective lens L1 with regard to the beam entering from the incident surface r3. In FIG. 4 (and the following drawings showing astigmatism), a horizontal axis represents positions in a direction of the optical axis (unit: mm), a vertical axis represents an angle of emergence (unit: degree), a solid curved line S represents a sagittal image surface, and a curved broken line M represents a meridional image surface.

FIGS. 5A-5D are graphs showing transverse aberrations of the objective lens L1 with regard to the beam entering from the incident surface r3. FIGS. 6A-6D are graphs showing the wavefront aberrations of the objective lens L1 with regard to the beam entering from the incident surface r3. In FIGS. 5A-5D (and in FIGS. 6A-6D), aberrations with respect to the beam having wavelength of 532 nm at the image heights y of 0.00, 0.02, 0.05 and 0.07 (mm) are indicated, respectively. The image heights y of 0.02 mm, 0.05 mm and 0.07 mm correspond to the field angles W [degree] of 1.3, 2.7 and 4.0, respectively. The field angle of 4.0 degree is the maximum field angle.

FIG. 7 is a graph showing a relationship between an RMS value of the wavefront aberration and the field angle with regard to the beam entering from the incident surface r3. In FIG. 7 (and in the following drawings showing the same relationship), a horizontal axis represents the field angle, a vertical axis represents the RMS value of the wavefront aberration.

Figure 8:
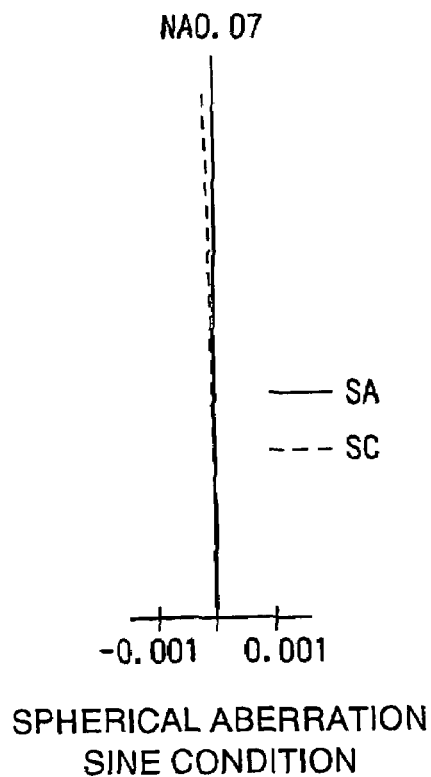
FIG. 8 is a graph showing the spherical aberration and the sine condition of the objective lens of the first example with regard to a beam entering from an exit surface.
Figure 9:
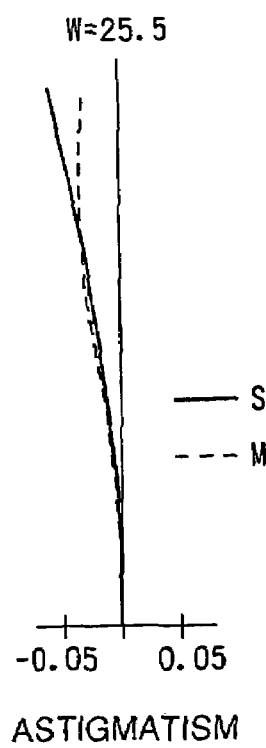
FIG. 9 is a graph showing astigmatism of the objective lens of the first example with regard to the beam entering from the exit surface.
Figure 10A:
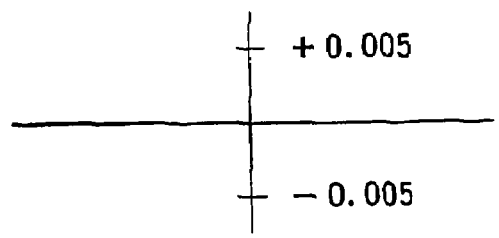
FIGS. 10A-10D are graphs showing transverse aberrations of the objective lens of the first example with regard to the beam entering from the exit surface.
Figure 10B:
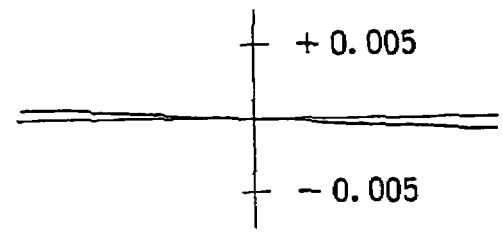
Figure 10C:
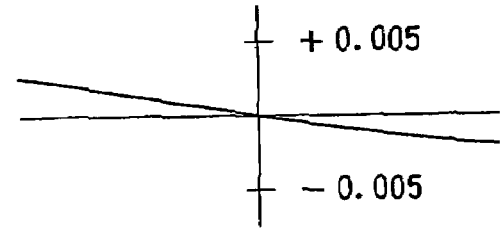
Figure 10D:
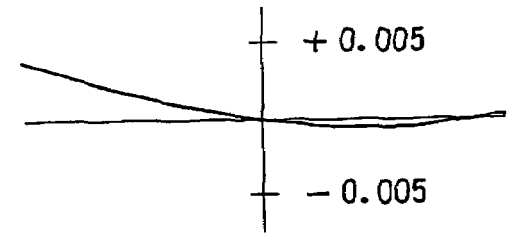

FIG. 8 is a graph showing the spherical aberration and the sine condition of the objective lens L1 with regard to the beam entering from the exit surface r4. FIG. 9 is a graph showing astigmatism of the objective lens L1 with regard to the beam entering from the exit surface r4.

FIGS. 10A-10D are graphs showing transverse aberrations of the objective lens L1 with regard to the beam entering from the exit surface r4. FIGS. 11A-11D are graphs showing the wavefront aberrations of the objective lens L1 with regard to the beam entering from the exit surface r4. In FIGS. 10A-10D (and in FIGS. 11A-11D), aberrations with respect to the beam having wavelength of 532 nm at the image heights y of 0.00, 0.15, 0.29 and 0.43 (mm) are indicated, respectively. The image heights y of 0.15 mm, 0.29 mm and 0.43 mm correspond to the field angles W [degree] of 8.5, 17.0 and 25.5, respectively. The field angle of 25.5 degree is the maximum field angle.

FIG. 12 is a graph showing a relationship between an RMS value of the wavefront aberration and the field angle with regard to the beam entering from the exit surface r4.

Figure 13:
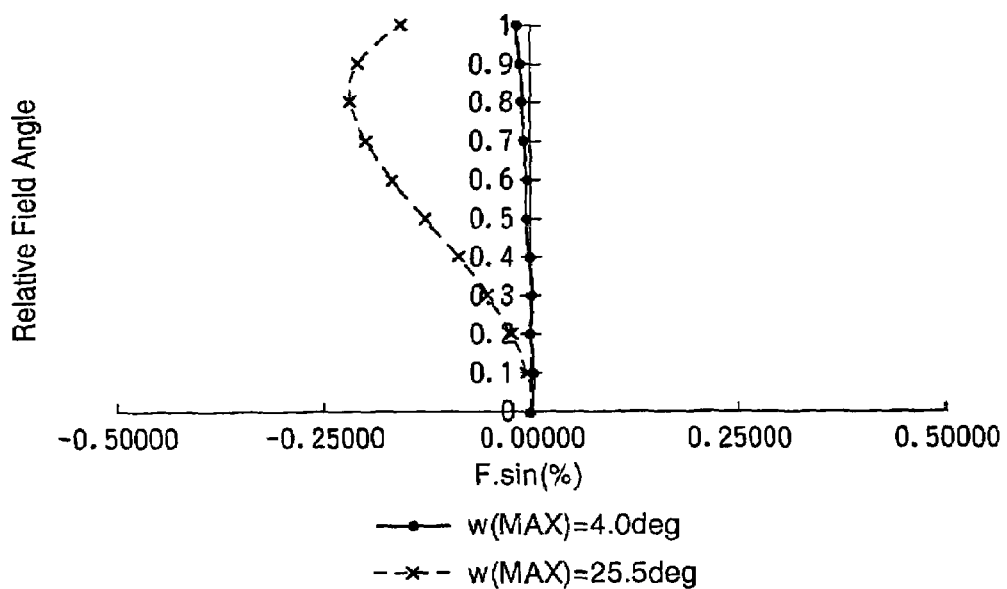
FIG. 13 is a graph showing a f sin W characteristic of the objective lens of the first example.

FIG. 13 is a graph showing the f sin W characteristic of the objective lens L1 defined by:

$$\{(y'-y)/y\} \times 100\%$$

where y represents an ideal image height and y' represents an actual image height. That is, the f sin W characteristic represents the degree of satisfaction of the actual image height y' with respect to the ideal image height y. It should be noted that when the actual image height is equal to the ideal image height y, the f sin W characteristic takes a value of 0%.

In FIG. 13 (and in FIGS. 25, 33, 41 and 49), a horizontal axis represents the f sin W characteristic, and a vertical axis represents a relative field angle. In FIG. 13, a solid curved line represents the f sin W characteristic with regard to the beam entering from the incident surface r3, and a broken curved line represents the f sin W characteristic with regard to the beam entering from the exit surface r4.

As can be seen from FIG. 2 and TABLE 4, the objective lens L1 satisfies the conditions (2) and (3). Further, the objective lens L1 takes r/tc of 1.009, and therefore the objective lens L1 satisfies the condition (4). As can be seen from FIGS. 3-6D and FIGS. 8-11D, the aberrations are sufficiently corrected.

As can be seen from FIGS. 7 and 12, the RMS value of the wavefront aberration is suppressed lower than or equal to Marechal criterion within the maximum field angle with regard to both of the beams entering from the surfaces r3 and entering from the surface r4.

As can be seen from FIG. 13, the f sin W characteristic of the objective lens L1 used as a measure for an evaluation of optical performance of the fourier transform lens is excellent.

As described above, although the objective lens L1 is configured as a single lens, the objective lens L1 has sufficiently corrected aberrations and has high performance as the fourier transform lens. Accordingly, the objective lens L1 is suitable for recording/reproducing information to/from the hologram disc.

Further, as shown in TABLE 1 and TABLE 3, the objective lens L1 has a sufficient refractive index for supporting high NA. That is, the objective lens L1 achieves the high NA while keeping the above mentioned high optical performance.

SECOND EXAMPLE

A second example according to the embodiment will be described. A lens arrangement of an objective lens system according to the second example is substantially the same as the first example, therefore, a detailed explanation thereof are not repeated. The objective lens system of the second example has an objective lens L2 in place of the objective lens L1 of the first example.

TABLE 5, TABLE 6 and TABLE 7 indicate numerical structure of the objective lens system of the second example. Symbols and fields in TABLEs 5-7 have the same meanings as those indicated in TABLEs 1-3.

TABLE 5

| Surface No. | r | d | n | ν | Nd |
|---|---|---|---|---|---|
| #1 | ∞ | 0.200 | 1.51900 | 64.1 | 1.51633 |
| #2 | ∞ | 0.438 | | | |
| #3 | 1.157 | 1.173 | 1.73675 | 40.5 | 1.73077 |
| #4 | −1.157 | 0.438 | | | |
| #5 | ∞ | 0.200 | 1.51900 | 64.1 | 1.51633 |
| #6 | ∞ | — | | | |

TABLE 6

| | #3 | #4 |
|---|---|---|
| k | 0.0000E+00 | 0.0000E+00 |
| A4 | −0.17636E+00 | 0.17636E+00 |
| A6 | −0.15177E+00 | 0.15177E+00 |
| A8 | 0.0000E+00 | 0.0000E+00 |
| A10 | 0.0000E+00 | 0.0000E+00 |
| A12 | 0.0000E+00 | 0.0000E+00 |

TABLE 7

| | #3 | #4 |
|---|---|---|
| FNO | 1:1.3 | 1:7.1 |
| f | 1.00 | 1.00 |
| W | 4.0 | 23.6 |
| NA | 0.400 | 0.075 |

Similarly to the objective lens L1 of the first example, the surfaces #3 and #4 of the objective lens L2 of the second example are symmetrical with respect to a plane perpendicular to an optical axis of the objective lens L2. The field angles of the objective lens L2 for the beam entering from the incident surface r3 (#3) and for the beam entering from the exit surface r4 (#4) are different from each other. Further, diameters of the entrance pupils of the objective lens L2 for the beam entering from the incident surface (#3) and for the beam entering from the exit surface (#4) are different from each other.

As shown in TABLE 7, the objective lens L2 accomplishes a high NA for a collimated beam entering from the incident surface, and therefore the objective lens L2 enables to record/reproduce high definition optical information. Accordingly, by using the objective lens L2, the high density address information in the recording media can be read. Further, the objective lens L2 achieves a wide field angle, and therefore the objective lens L2 enables to detect the hologram information from the hologram disc with high accuracy.

Figure 14:
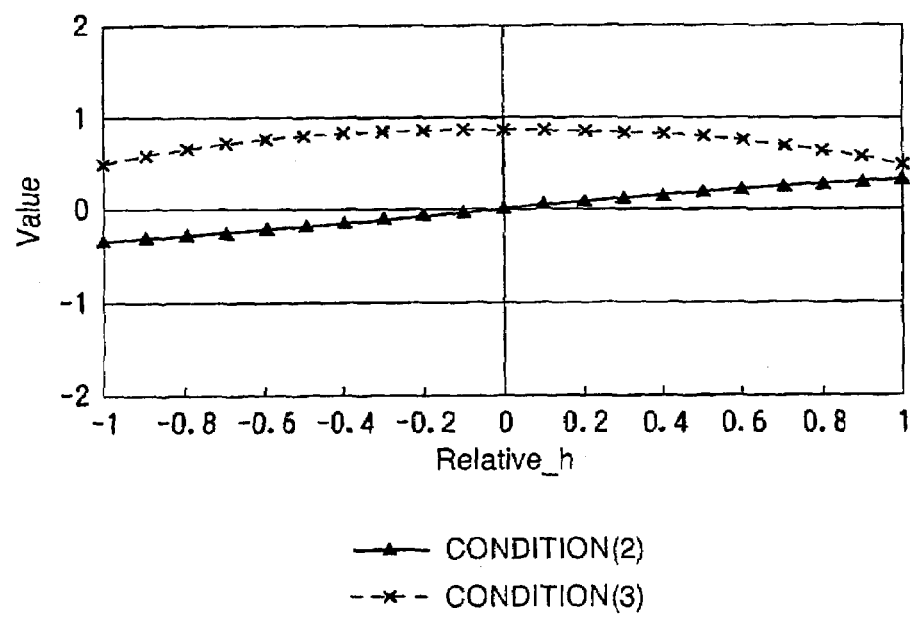
FIG. 14 is a graph illustrating values of the condition (2) and (3) of a second example according to the embodiment.

FIG. 14 is a graph illustrating values of the condition (2) and (3) which define the shape of the surface r3 (r4) of the objective lens L2. TABLE 8 shows numerical data of the formula (1) and the conditions (2) and (3) regarding the second example. Since the surface r3 (#3) and the surface r4 (#4) have the same shape, both of the surface r3 (#3) and the surface r4 (#4) take numerical data indicated in TABLE 8.

TABLE 8

| | | Surface #3 (#4) | | |
|---|---|---|---|---|
| Relative h | h [mm] | formula (1) F(h) | Condition (2) dF(h)/dh | Condition (3) $d^2F(h)/d^2h$ |
| 1 | 0.446 | 8.983E−02 | 0.33927 | 0.49958 |
| 0.9 | 0.4014 | 7.208E−02 | 0.31493 | 0.58892 |
| 0.8 | 0.3568 | 5.650E−02 | 0.28699 | 0.66128 |
| 0.7 | 0.3122 | 4.297E−02 | 0.25616 | 0.71893 |
| 0.6 | 0.2676 | 3.140E−02 | 0.22304 | 0.76405 |
| 0.5 | 0.223 | 2.171E−02 | 0.18816 | 0.79862 |
| 0.4 | 0.1784 | 1.384E−02 | 0.15194 | 0.82440 |
| 0.3 | 0.1338 | 7.765E−03 | 0.11473 | 0.84288 |
| 0.2 | 0.0892 | 3.445E−03 | 0.07684 | 0.85522 |
| 0.1 | 0.0446 | 8.602E−04 | 0.03853 | 0.86228 |
| 0 | 0 | 0 | 0 | 0.86457 |
| −0.1 | −0.0446 | 8.602E−04 | −0.03853 | 0.86228 |
| −0.2 | −0.0892 | 3.445E−03 | −0.07684 | 0.85522 |
| −0.3 | −0.1338 | 7.765E−03 | −0.11473 | 0.84288 |
| −0.4 | −0.1784 | 1.384E−02 | −0.15194 | 0.82440 |
| −0.5 | −0.223 | 2.171E−02 | −0.18816 | 0.79862 |
| −0.6 | −0.2676 | 3.140E−02 | −0.22304 | 0.76405 |
| −0.7 | −0.3122 | 4.297E−02 | −0.25616 | 0.71893 |
| −0.8 | −0.3568 | 5.650E−02 | −0.28699 | 0.66128 |
| −0.9 | −0.4014 | 7.208E−02 | −0.31493 | 0.58892 |
| −1 | −0.446 | 8.983E−02 | −0.33927 | 0.49958 |

FIGS. 15-19 are graphs showing optical performance of the objective lens L2 with regard to the beam entering from the incident surface r3. FIGS. 20-24 are graphs showing optical performance of the objective lens L2 with regard to the beam entering from the exit surface r4.

Figure 15:
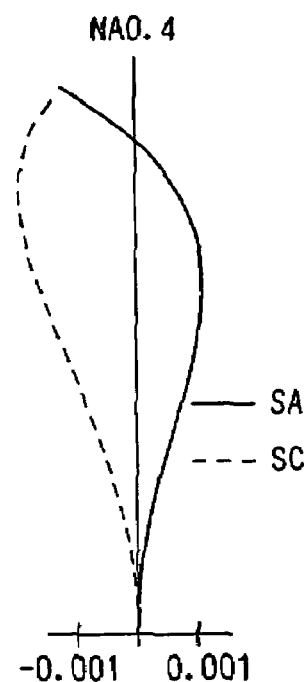
FIG. 15 is a graph showing the spherical aberration and the sine condition of the objective lens of the second example with regard to the beam entering from the incident surface.
Figure 16:
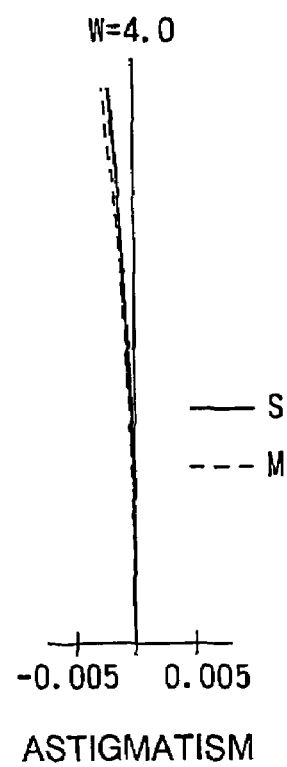
FIG. 16 is a graph showing astigmatism of the objective lens of the second example with regard to the beam entering from the incident surface.
Figure 17A:
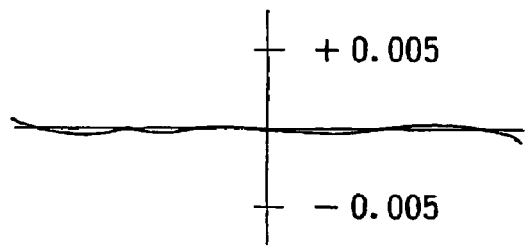
FIGS. 17A-17D are graphs showing transverse aberrations of the objective lens of the second embodiment with regard to the beam entering from the incident surface.
Figure 17B:
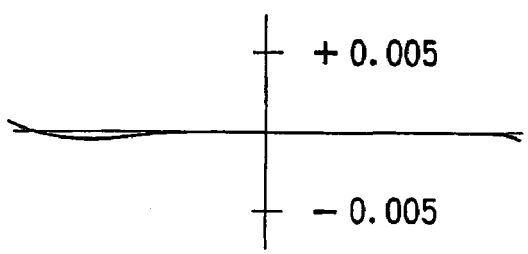
Figure 17C:
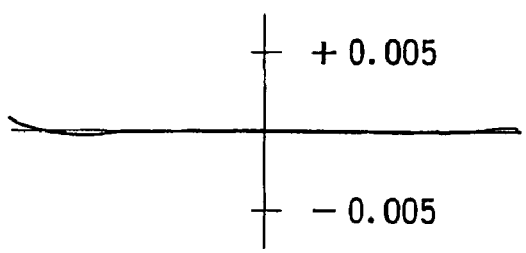
Figure 17D:
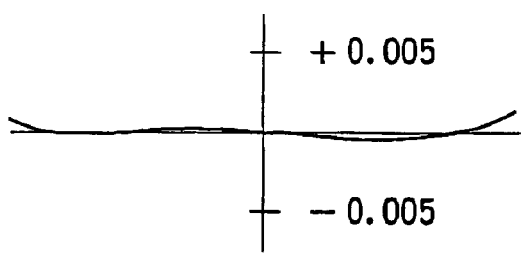
Figure 18A:
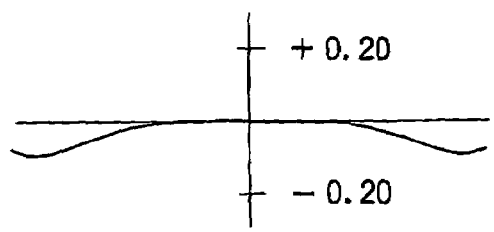
FIGS. 18A-18D are graphs showing the wavefront aberrations of the objective lens of the second example with regard to the beam entering from the incident surface.
Figure 18B:
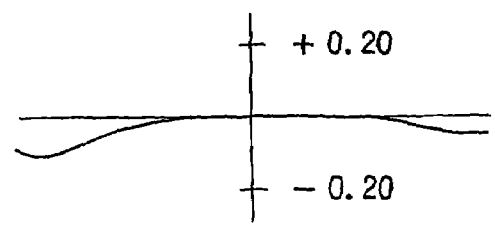
Figure 18C:
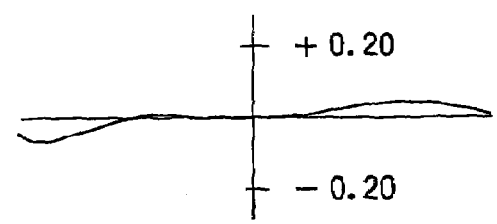
Figure 18D:
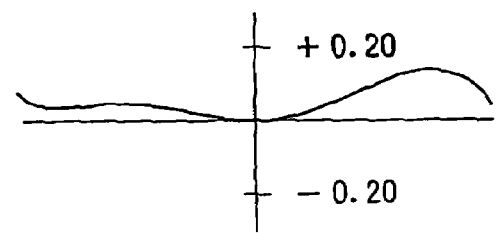
Figure 20:
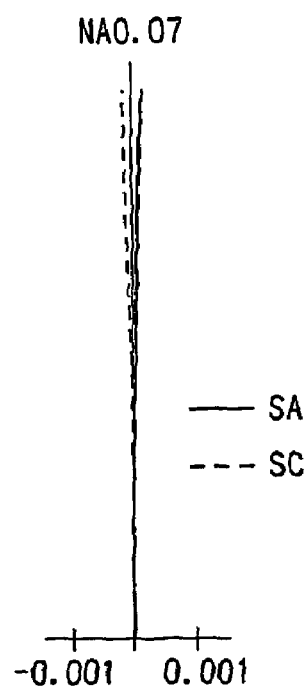
FIG. 20 is a graph showing the spherical aberration and the sine condition of the objective lens of the second example with regard to the beam entering from the exit surface.
Figure 21:
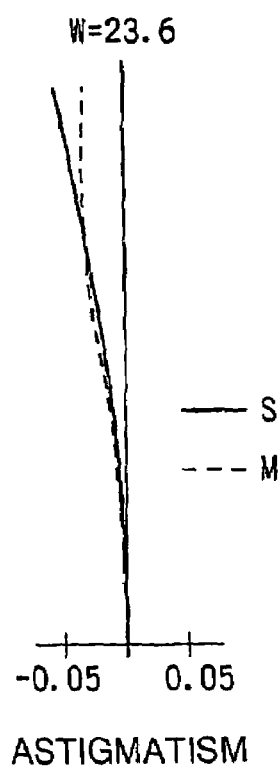
FIG. 21 is a graph showing astigmatism of the objective lens of the second example with regard to the beam entering from the exit surface.
Figure 22A:
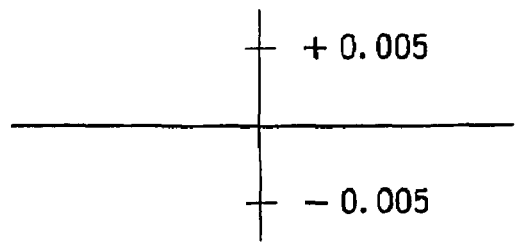
FIGS. 22A-22D are graphs showing transverse aberrations of the objective lens of the second example with regard to the beam entering from the exit surface.
Figure 22B:
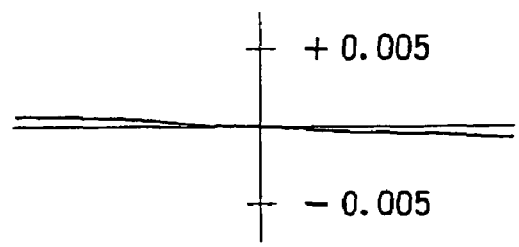
Figure 22C:
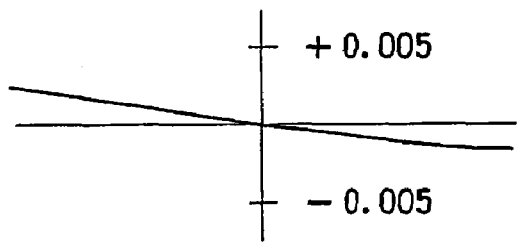
Figure 22D:
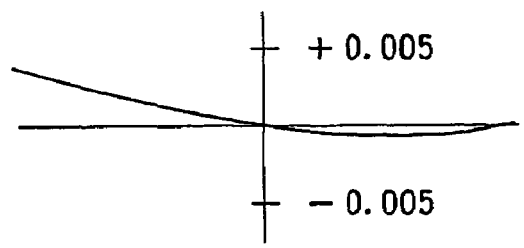

Each of FIGS. 15 and 20 is a graph showing the spherical aberration and the sine condition of the objective lens L2. Each of FIGS. 16 and 21 is a graph showing astigmatism of the objective lens L2.

FIGS. 17A-17D are graphs showing transverse aberrations of the objective lens L2 with regard to the beam entering from the incident surface r3. FIGS. 22A-22D are graphs showing transverse aberrations of the objective lens L2 with regard to the beam entering from the exit surface r4.

FIGS. 18A-18D are graphs showing the wavefront aberrations of the objective lens L2 with regard to the beam entering from the incident surface r3. Similarly, FIGS. 23A-23D are graphs showing the wavefront aberrations of the objective lens L2 with regard to the beam entering from the exit surface r4.

In FIGS. 17A-17D (and in FIGS. 18A-18D), aberrations with respect to the beam having wavelength of 532 nm at the image heights y of 0.00, 0.02, 0.05 and 0.07 (mm) are indicated, respectively. The image heights y of 0.02 mm, 0.05 mm and 0.07 mm correspond to the field angles W [degree] of 1.3, 2.7 and 4.0, respectively. The field angle of 4.0 degree is the maximum field angle.

In FIGS. 22A-22D (and in FIGS. 23A-23D), aberrations with respect to the beam having wavelength of 532 nm at the image heights y of 0.00, 0.14, 0.27 and 0.40 (mm) are indicated, respectively. The image heights y of 0.14 mm, 0.27 mm and 0.40 mm correspond to the field angles W [degree] of 7.9, 15.7 and 23.6, respectively. The field angle of 23.6 degree is the maximum field angle.

Figure 19:
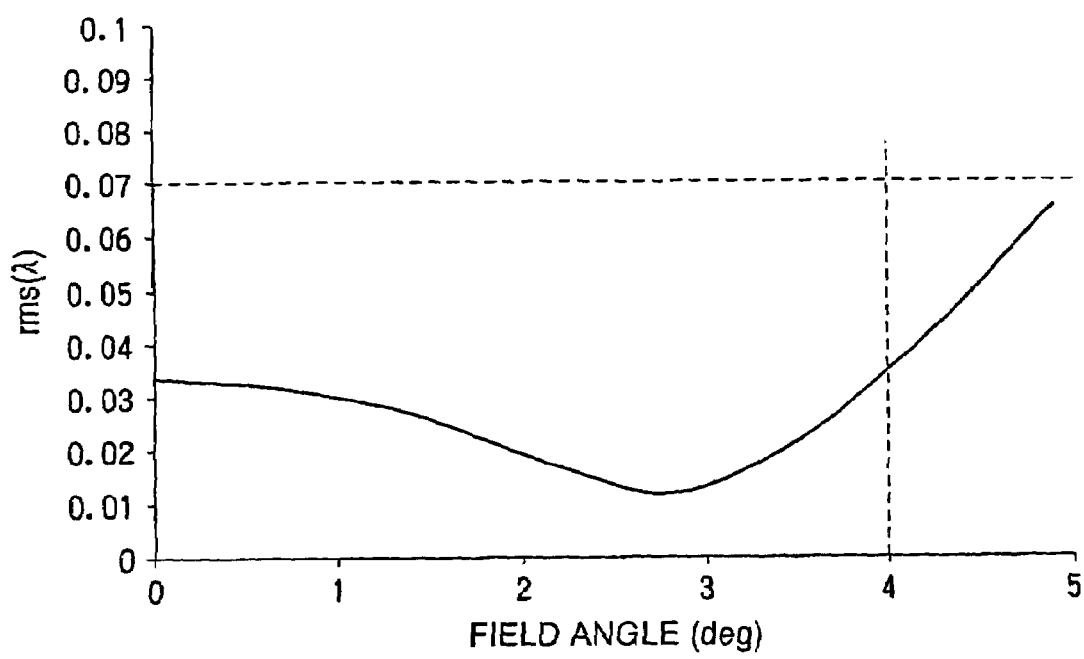
FIG. 19 is a graph showing a relationship between an RMS value of the wavefront aberration and the field angle of the second example with regard to the beam entering from the incident surface.

FIG. 19 is a graph showing a relationship between an RMS value of the wavefront aberration and the field angle with regard to the beam entering from the incident surface r3. FIG. 24 is a graph showing a relationship between an RMS value of the wavefront aberration and the field angle with regard to the beam entering from the exit surface r4.

Figure 25:
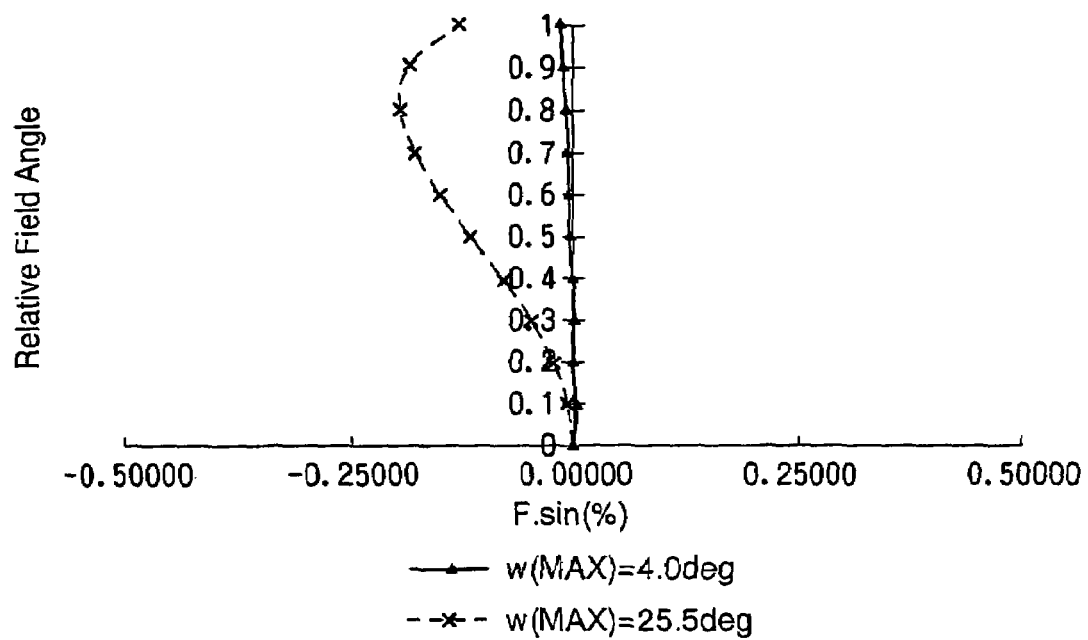
FIG. 25 is a graph showing the f sin W characteristic of the objective lens of the second example.

Similarly to FIG. 13, FIG. 25 is a graph showing the f sin W characteristic of the objective lens L2. In FIG. 25, a solid curved line represents the f sin W characteristic with regard to the beam entering from the incident surface r3, and a broken curved line represents the f sin W characteristic with regard to the beam entering from the exit surface r4.

As can be seen from FIG. 14 and TABLE 8, the objective lens L2 of the second example satisfies the conditions (2) and (3). Further, the objective lens L2 takes r/tc of 0.986, and therefore the objective lens L2 satisfies the condition (4). As can be seen from FIGS. 15-18D and FIGS. 20-23D, the aberrations are sufficiently corrected.

As can be seen from FIGS. 19 and 24, the RMS value of the wavefront aberration is suppressed lower than or equal to Marechal criterion within the maximum field angle with regard to both of the beams entering from the surfaces r3 and r4.

As can be seen from FIG. 25, the f sin W characteristic of the objective lens L2 used as a measure for an evaluation of optical performance of the fourier transform lens is excellent.

As described above, although the objective lens L2 is configured as a single lens, the objective lens L2 has sufficiently corrected aberrations and has high performance as the fourier transform lens. Accordingly, the objective lens L2 is suitable for recording/reproducing information to/from the hologram disc.

Further, as shown in TABLE 5 and TABLE 7, the objective lens L2 has a sufficient refractive index for supporting high NA. That is, the objective lens L2 achieves the high NA while keeping the above mentioned high optical performance.

THIRD EXAMPLE

Figure 26:
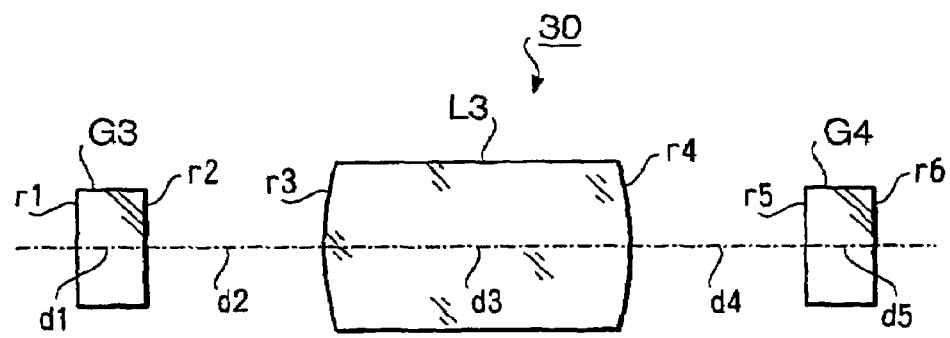
FIG. 26 shows a lens arrangement of an objective lens system according to a third example of the embodiment.

FIG. 26 shows a lens arrangement of an objective lens system 30 according to a third example of the embodiment of the present invention. As shown in FIG. 26, the objective lens system 30 includes an optical element G3 which is one of a cover layer of the spatial light modulator (SLM) and a plate constituting a phase shifter such as a compensator, an objective lens L3, and a plate G4 constituting a cover layer of the recording medium. The optical element G3 is located on a light source side with respect to the objective lens L3. As described above, the surface r3 of the objective lens L3 is an incident surface, and the surface r4 of the objective lens L3 is an exit surface.

TABLE 9 and TABLE 10 indicate numerical structure of the objective lens system 30. Symbols and fields in TABLEs 9 and 10 have the same meanings as those indicated in TABLEs 1 and 2. Values of "r" of surfaces #1-#6 listed in TABLE 9 respectively correspond to surfaces indicated by reference numbers r1-r6 in FIG. 26. Values of "d" of surfaces. #1-#5 listed in TABLE 9 respectively correspond to distances indicated by reference numbers d1-d5 in FIG. 26.

TABLE 9

FNO = 1:3.1, f = 1.00, W = 9.2, NA = 0.16

| Surface No. | r | d | n | v | nd |
|---|---|---|---|---|---|
| #1 | ∞ | 0.200 | 1.51900 | 64.1 | 1.51633 |
| #2 | ∞ | 0.520 | | | |
| #3 | 0.979 | 0.915 | 1.59233 | 61.2 | 1.58913 |
| #4 | −0.979 | 0.520 | | | |
| #5 | ∞ | 0.200 | 1.51900 | 64.1 | 1.51633 |
| #6 | ∞ | — | | | |

TABLE 10

| | #3 | #4 |
|---|---|---|
| k | 0.0000E+00 | 0.0000E+00 |
| A4 | −0.28725E+00 | 0.28725E+00 |
| A6 | −0.15607E+00 | 0.15607E+00 |
| A8 | 0.0000E+00 | 0.0000E+00 |
| A10 | 0.0000E+00 | 0.0000E+00 |
| A12 | 0.0000E+00 | 0.0000E+00 |

In contrast to the objective lens L1 and the objective lens L2, the objective lens L3 is configured such that not only surfaces r3 (#3) and r4 (#4) of the objective lens L3 are symmetrical with respect to a plane perpendicular to an optical axis of the objective lens L3, but also the field angles for the beam entering from the incident surface r3 (#3) and for the beam entering from the exit surface r4 (#4) are equal to each other. Further, the entrance pupils for the beam entering from the incident surface r3 (#3) and for the beam entering from the exit surface r4 (#4) are equal to each other. As indicated in TABLE 9, the objective lens L3 has the F number (FNO) of 1:3.1, a focus length (f) of 1.00 mm, a field angle (W) of 9.2 degree, and the numerical aperture (NA) of 0.16 with regard to both of the beams entering from the surfaces r3 and entering from the surface r4.

As shown in TABLE 9, the objective lens L3 achieves a wide field angle, and therefore the objective lens L3 enables to detect the hologram information from the hologram disc with high accuracy.

Figure 27:
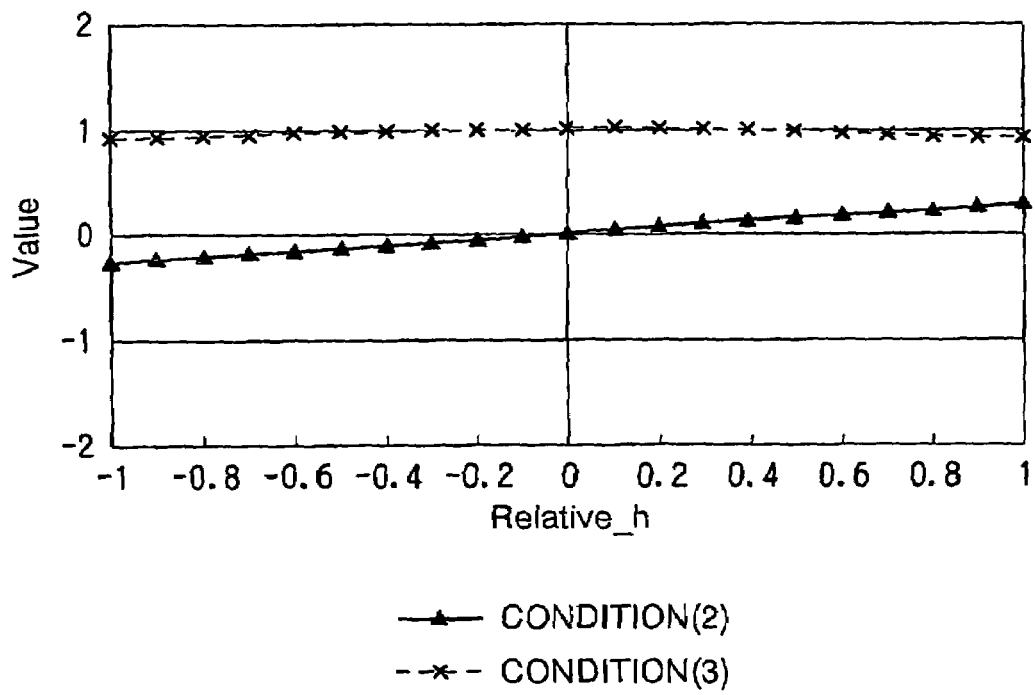
FIG. 27 is a graph illustrating values of the conditions (2) and (3) of the third example.

FIG. 27 is a graph illustrating values of the conditions (2) and (3) which define the shape of the surface r3 (r4) of the objective lens L3. TABLE 11 shows numerical data of the formula (1) and the conditions (2) and (3) regarding the third example. Since the surface r3 (#3) and the surface r4 (#4) have the same shape, both of the surfaces r3 and r4 take numerical data indicated in TABLE 11.

TABLE 11

| Relative h | h [mm] | formula (1) F(h) | Condition (2) dF(h)/dh | Condition (3) $d^2F(h)/d^2h$ |
|---|---|---|---|---|
| 1 | 0.272 | 3.859E−02 | 0.26691 | 0.92577 |
| 0.9 | 0.2448 | 3.113E−02 | 0.24168 | 0.93069 |
| 0.8 | 0.2176 | 2.451E−02 | 0.21621 | 0.94295 |
| 0.7 | 0.1904 | 1.870E−02 | 0.19036 | 0.95795 |
| 0.6 | 0.1632 | 1.371E−02 | 0.16409 | 0.97340 |
| 0.5 | 0.136 | 9.497E−03 | 0.13742 | 0.98768 |
| 0.4 | 0.1088 | 6.067E−03 | 0.11038 | 0.99987 |
| 0.3 | 0.0816 | 3.408E−03 | 0.08305 | 1.00950 |
| 0.2 | 0.0544 | 1.513E−03 | 0.05549 | 1.01638 |
| 0.1 | 0.0272 | 3.781E−04 | 0.02778 | 1.02050 |
| 0 | 0 | 0 | 0 | 1.02187 |
| −0.1 | −0.0272 | 3.781E−04 | −0.02778 | 1.02050 |
| −0.2 | −0.0544 | 1.513E−03 | −0.05549 | 1.01638 |
| −0.3 | −0.0816 | 3.408E−03 | −0.08305 | 1.00950 |
| −0.4 | −0.1088 | 6.067E−03 | −0.11038 | 0.99987 |
| −0.5 | −0.136 | 9.497E−03 | −0.13742 | 0.98768 |
| −0.6 | −0.1632 | 1.371E−02 | −0.16409 | 0.97340 |
| −0.7 | −0.1904 | 1.870E−02 | −0.19036 | 0.95795 |
| −0.8 | −0.2176 | 2.451E−02 | −0.21621 | 0.94295 |
| −0.9 | −0.2448 | 3.113E−02 | −0.24168 | 0.93096 |
| −1 | −0.272 | 3.859E−02 | −0.26691 | 0.92577 |

Figure 28:
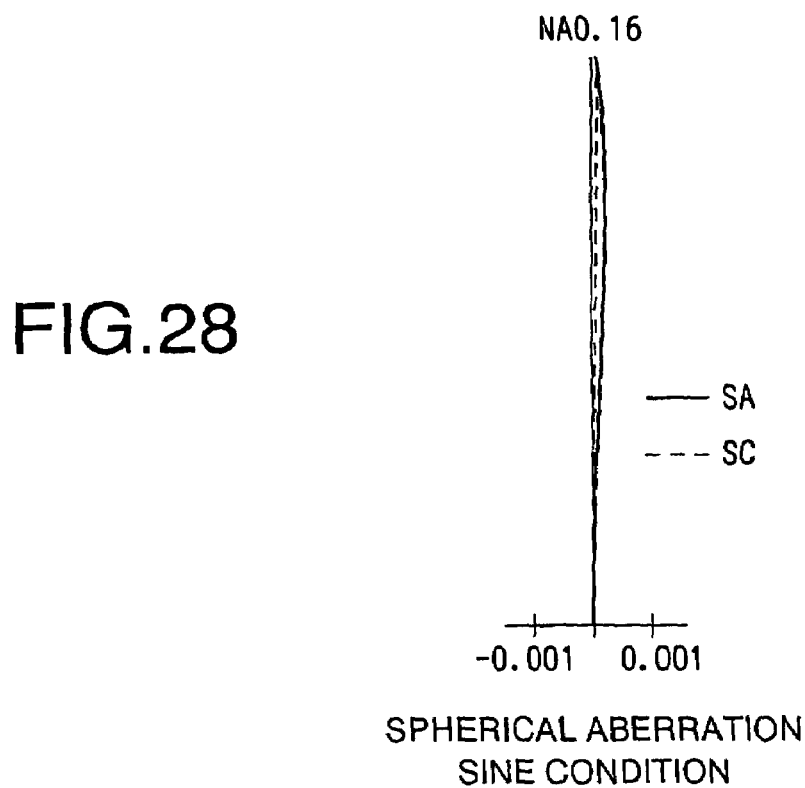
FIG. 28 is a graph showing the spherical aberration and the sine condition of the objective lens of the third example.
Figure 29:
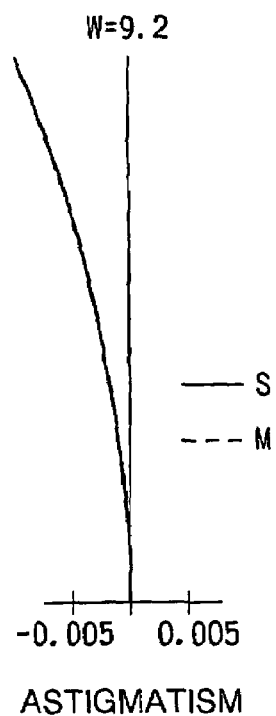
FIG. 29 is a graph showing astigmatism of the objective lens of the third example.
Figure 30A:
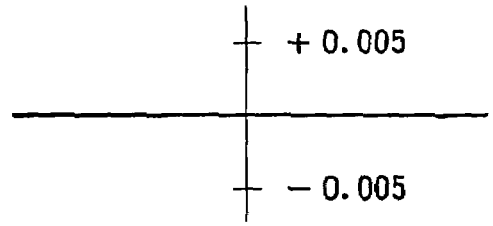
FIGS. 30A-30D are graphs showing transverse aberrations of the objective lens of the third example.
Figure 30B:
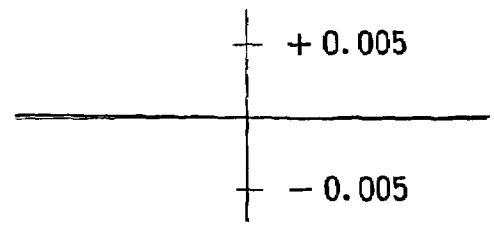
Figure 30C:
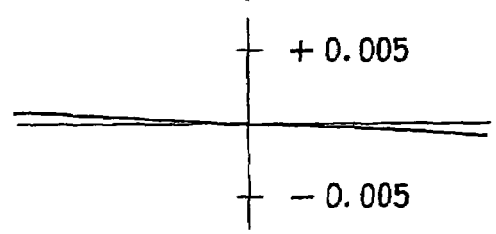
Figure 30D:
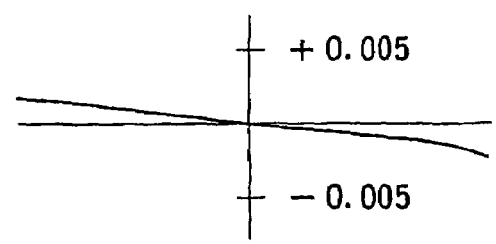

FIG. 28 is a graph showing the spherical aberration and the sine condition of the objective lens L3. FIG. 29 is a graph showing astigmatism of the objective lens L3.

FIGS. 30A-30D are graphs showing transverse aberrations of the objective lens L3. FIGS. 31A-31D are graphs showing the wavefront aberrations of the objective lens L3. In FIGS. 30A-30D (and in FIGS. 31A-31D), aberrations with respect to the beam having wavelength of 532 nm at the image heights y of 0.00, 0.05, 0.11 and 0.16 (mm) are indicated, respectively. The image heights y of 0.05 mm, 0.11 mm and 0.16 mm correspond to the field angles W [degree] of 3.1, 6.1 and 9.2, respectively. The field angle of 9.2 degree is the maximum field angle.

FIG. 32 is a graph showing a relationship between an RMS value of the wavefront aberration and the field angle. Similarly to FIG. 13, FIG. 33 is a graph showing the f sin W characteristic of the objective lens L3.

As can be seen from FIG. 27 and TABLE 11, the objective lens L3 of the third example satisfies the conditions (2) and (3). Further, the objective lens L3 takes r/tc of 1.069, and therefore the objective lens L3 satisfies the condition (4). As can be seen from FIGS. 28-31D, the aberrations are sufficiently corrected.

As can be seen from FIG. 32, the RMS value of the wavefront aberration is suppressed lower than or equal to Marechal criterion within the maximum field angle with regard to both of the beams entering from the surfaces r3 and r4.

Figure 33:
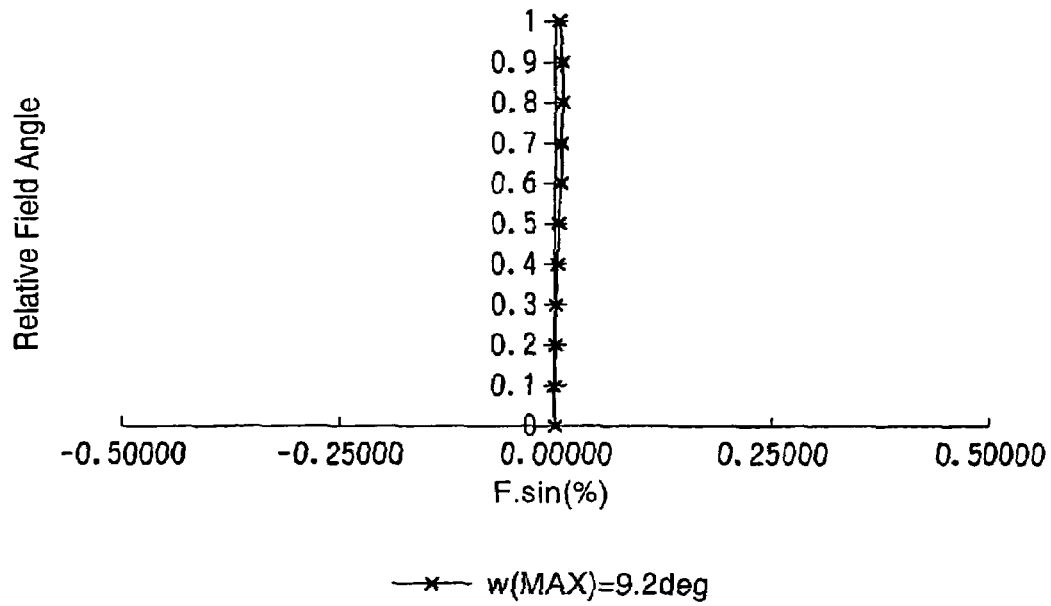
FIG. 33 is a graph showing the f sin W characteristic of the objective lens of the third example.

As can be seen from FIG. 33, the f sin W characteristic of the objective lens L3 used as a measure for an evaluation of optical performance of the fourier transform lens is excellent.

As described above, although the objective lens L3 is configured as a single lens, the objective lens L3 has sufficiently corrected aberrations and has high performance as the fourier transform lens. Accordingly, the objective lens L3 is suitable for recording/reproducing information to/from the hologram disc.

FOURTH EXAMPLE

Figure 34:
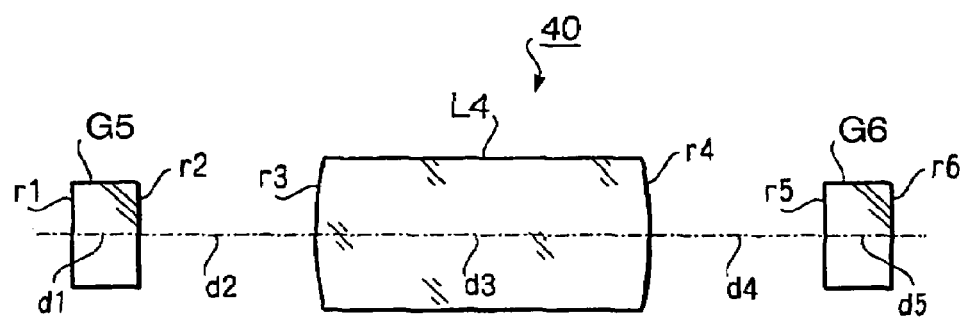
FIG. 34 shows a lens arrangement of an objective lens system according to a fourth example of the embodiment.

FIG. 34 shows a lens arrangement of an objective lens system 40 according to a fourth example of the embodiment of the present invention. As shown in FIG. 34, the objective lens system 40 includes an optical element G5 which is one of a cover layer of the spatial light modulator (SLM) and a plate constituting a phase shifter such as a compensator, an objective lens L4, and a plate G6 constituting a cover layer of the recording medium. The optical element G5 is located on a light source side with respect to the objective lens L4. As described above, the surface r3 of the objective lens L4 is an incident surface, and the surface r4 of the objective lens L4 is an exit surface.

TABLE 12 and TABLE 13 indicate numerical structure of the objective lens system 40. Symbols and fields in TABLEs 12 and 13 have the same meanings as those indicated in TABLEs 9 and 10. Values of "r" of surfaces #1-#6 listed in TABLE 12 respectively correspond to surfaces indicated by reference numbers r1-r6 in FIG. 34. Values of "d" of surfaces #1-#5 listed in TABLE 12 respectively correspond to distances indicated by reference numbers d1-d5 in FIG. 34.

TABLE 12

FNO = 1:3.3, f = 1.00, W = 8.6, NA = 0.15

| Surface No. | r | d | n | ν | nd |
|---|---|---|---|---|---|
| #1 | ∞ | 0.200 | 1.51900 | 64.1 | 1.51633 |
| #2 | ∞ | 0.537 | | | |
| #3 | 1.434 | 1.027 | 1.85898 | 32.3 | 1.85026 |
| #4 | −1.434 | 0.537 | | | |
| #5 | ∞ | 0.200 | 1.51900 | 64.1 | 1.51633 |
| #6 | ∞ | — | | | |

TABLE 13

| | #3 | #4 |
|---|---|---|
| k | 0.0000E+00 | 0.0000E+00 |
| A4 | −0.18846E+00 | 0.18846E+00 |
| A6 | 0.25466E+01 | −0.25466E+01 |
| A8 | −0.23515E+02 | 0.23515E+02 |
| A10 | 0.0000E+00 | 0.0000E+00 |
| A12 | 0.0000E+00 | 0.0000E+00 |

Similarly to the objective lens L3, the objective lens L4 is configured such that not only surfaces r3 (#3) and r4 (#4) of the objective lens L3 are symmetrical with respect to a plane perpendicular to an optical axis of the objective lens L4, but also the field angles for the beam entering from the incident surface r3 and for the beam entering from the exit surface r4 are equal to each other. Further, the entrance pupils for the beam entering from the incident surface r3 (#3) and for the beam entering from the exit surface r4 (#4) are equal to each other. As indicated in TABLE 12, the objective lens L4 has the F number (FNO) of 1:3.3, a focus length (f) of 1.00 mm, a field angle (W) of 8.6 degree, and the numerical aperture (NA) of 0.15 with regard to both of the beams entering from the surfaces r3 and entering from the surface r4.

As shown in TABLE 12, the objective lens L4 achieves a wide field angle, and therefore the objective lens L4 enables to detect the hologram information from the hologram disc with high accuracy.

Figure 35:
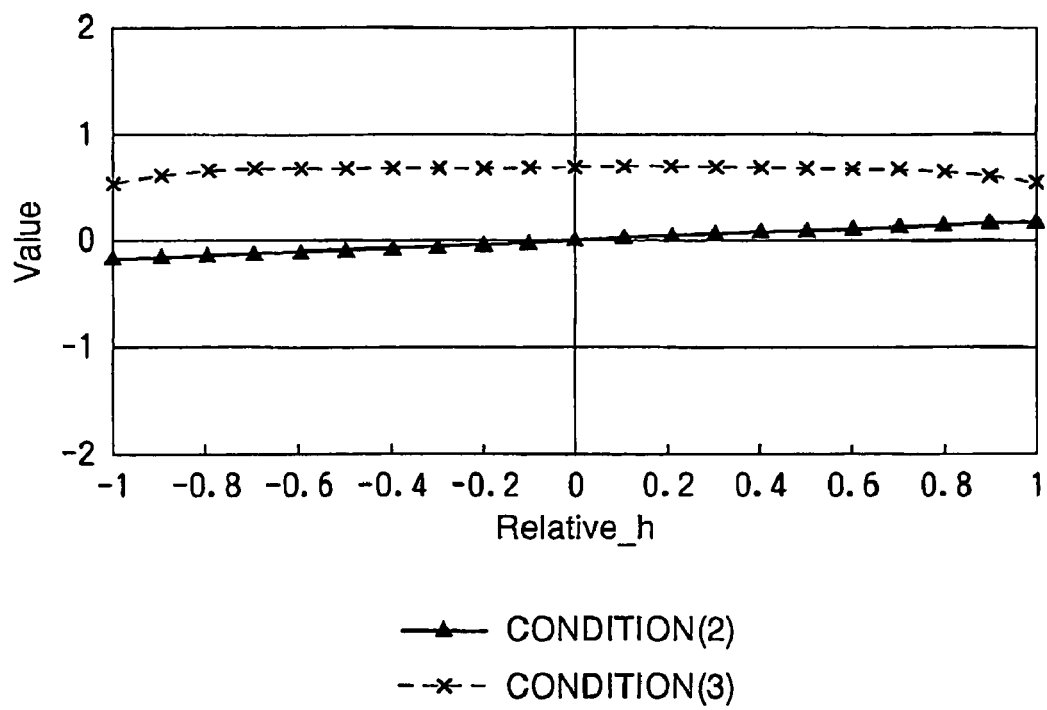
FIG. 35 is a graph illustrating values of the conditions (2) and (3) of the fourth example.

FIG. 35 is a graph illustrating values of the conditions (2) and (3) which define the shape of the surface r3 (r4) of the objective lens L4. TABLE 14 shows numerical data of the formula (1) and the conditions (2) and (3) regarding the fourth example. Since the surface r3 (#3) and the surface r4 (#4) have the same shape, both of the surfaces r3 and r4 take numerical data indicated in TABLE 14.

TABLE 14

| | | Surface #3 (#4) | | |
|---|---|---|---|---|
| Relative h | h [mm] | formula (1) F(h) | Condition (2) dF(h)/dh | Condition (3) $d^2F(h)/d^2h$ |
| 1 | 0.255 | 2.287E−02 | 0.17155 | 0.54596 |
| 0.9 | 0.2295 | 1.849E−02 | 0.15649 | 0.62569 |
| 0.8 | 0.204 | 1.459E−02 | 0.14000 | 0.66259 |
| 0.7 | 0.1785 | 1.116E−02 | 0.12289 | 0.67702 |
| 0.6 | 0.153 | 8.188E−03 | 0.10555 | 0.68169 |
| 0.5 | 0.1275 | 5.681E−03 | 0.08814 | 0.68370 |
| 0.4 | 0.102 | 3.633E−03 | 0.07068 | 0.68616 |
| 0.3 | 0.0765 | 2.043E−03 | 0.05314 | 0.68968 |
| 0.2 | 0.051 | 9.075E−04 | 0.03550 | 0.69351 |
| 0.1 | 0.0255 | 2.268E−04 | 0.01778 | 0.69646 |
| 0 | 0 | 0 | 0 | 0.69757 |
| −0.1 | −0.0255 | 2.268E−04 | −0.01778 | 0.69646 |
| −0.2 | −0.051 | 9.075E−04 | −0.03550 | 0.69351 |
| −0.3 | −0.0765 | 2.043E−03 | −0.05314 | 0.68968 |
| −0.4 | −0.102 | 3.633E−03 | −0.07068 | 0.68616 |
| −0.5 | −0.1275 | 5.681E−03 | −0.08814 | 0.68370 |
| −0.6 | −0.153 | 8.188E−03 | −0.10555 | 0.68169 |
| −0.7 | −0.1785 | 1.116E−02 | −0.12289 | 0.67702 |
| −0.8 | −0.204 | 1.459E−02 | −0.14000 | 0.66259 |
| −0.9 | −0.2295 | 1.849E−02 | −0.15649 | 0.62596 |
| −1 | −0.255 | 2.287E−02 | −0.17155 | 0.54596 |

Figure 36:
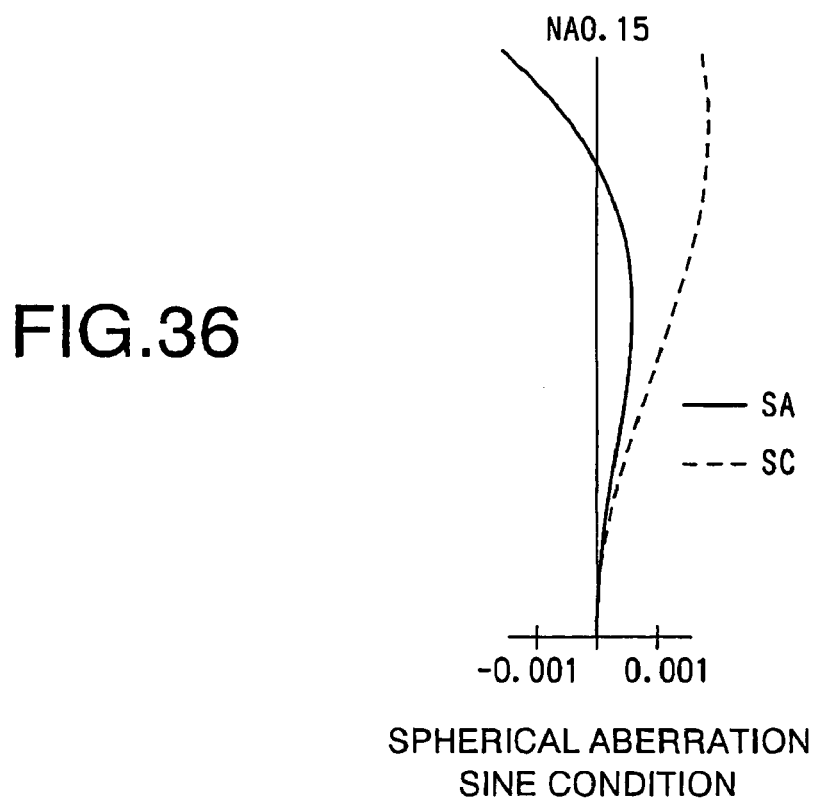
FIG. 36 is a graph showing the spherical aberration and the sine condition of the objective lens of the fourth example.

FIG. 36 is a graph showing the spherical aberration and the sine condition of the objective lens L4. FIG. 37 is a graph showing astigmatism of the objective lens L4.

FIGS. 38A-38D are graphs showing transverse aberrations of the objective lens L4. FIGS. 39A-39D are graphs showing the wavefront aberrations of the objective lens L4. In FIGS. 38A-38D (and in FIGS. 39A-39D), aberrations with respect to the beam having wavelength of 532 nm at the image heights y of 0.00, 0.05, 0.10 and 0.15 (mm) are indicated, respectively. The image heights y of 0.05 mm, 0.10 mm and 0.15 mm correspond to the field angles W [degree] of 2.9, 5.8 and 8.6, respectively. The field angle of 8.6 degree is the maximum field angle.

FIG. 40 is a graph showing a relationship between an RMS value of the wavefront aberration and the field angle. Similarly to FIG. 13, FIG. 41 is a graph showing the f sin W characteristic of the objective lens L4.

As can be seen from FIG. 35 and TABLE 14, the objective lens L4 of the fourth example satisfies the conditions (2) and (3). Further, the objective lens L4 takes r/tc of 1.395, and therefore the objective lens L4 satisfies the condition (4). As can be seen from FIGS. 36-39D, the aberrations are sufficiently corrected.

As can be seen from FIG. 40, the RMS value of the wavefront aberration is suppressed lower than or equal to Marechal criterion within the maximum field angle with regard to both of the beams entering from the surfaces r3 and r4.

Figure 41:
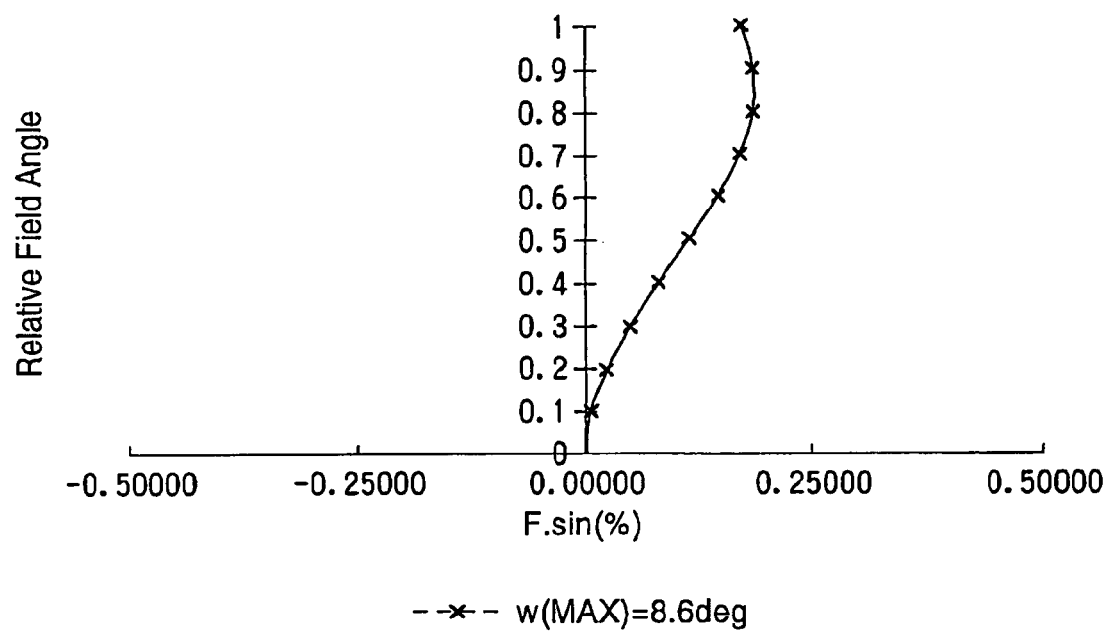
FIG. 41 is a graph showing the f sin W characteristic of the objective lens of the fourth example.

As can be seen from FIG. 41, the f sin W characteristic used as a measure for an evaluation of optical performance of the fourier transform lens is excellent.

As described above, although the objective lens L4 is configured as a single lens, the objective lens L4 has sufficiently corrected aberrations and has high performance as the fourier transform lens. Accordingly, the objective lens L4 is suitable for recording/reproducing information to/from the hologram disc.

FIFTH EXAMPLE

Figure 42:
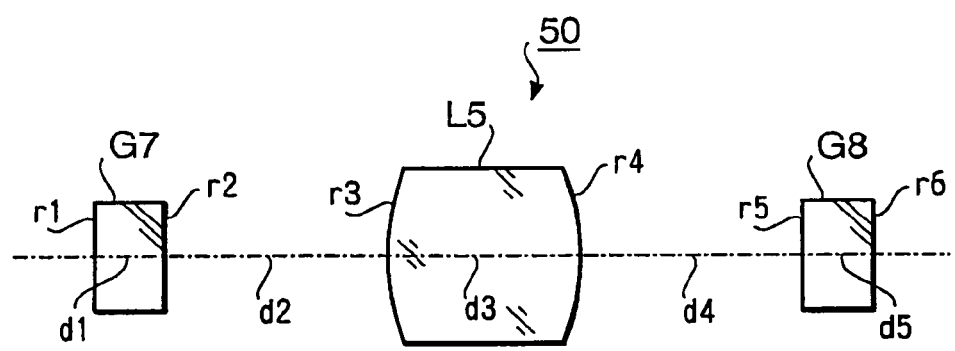
FIG. 42 shows a lens arrangement of an objective lens system according to a fifth example of the embodiment.

FIG. 42 shows a lens arrangement of an objective lens system 50 according to a fifth example of the embodiment of the present invention. As shown in FIG. 42, the objective lens system 50 includes an optical element G7 which is one of a cover layer of the spatial light modulator (SLM) and a plate constituting a phase shifter such as a compensator, an objective lens L5, and a plate G8 constituting a cover layer of the recording medium. The optical element G7 is located on a light source side with respect to the objective lens L5. As described above, the surface r3 of the objective lens L5 is an incident surface, and the surface r4 of the objective lens L5 is an exit surface.

TABLE 15 and TABLE 16 indicate numerical structure of the objective lens system 50. Symbols and fields in TABLEs 15 and 16 have the same meanings as those indicated in TABLEs 9 and 10. Values of "r" of surfaces #1-#6 listed in TABLE 15 respectively correspond to surfaces indicated by reference numbers r1-r6 in FIG. 42. Values of "d" of surfaces #1-#5 listed in TABLE 15 respectively correspond to distances indicated by reference numbers d1-d5 in FIG. 42.

TABLE 15

FNO = 1:3.3, f = 1.00, W = 8.6, NA = 0.15

| Surface No. | r | d | n | ν | nd |
|---|---|---|---|---|---|
| #1 | ∞ | 0.200 | 1.51900 | 64.1 | 1.51633 |
| #2 | ∞ | 0.647 | | | |
| #3 | 0.775 | 0.565 | 1.43578 | 95.0 | 1.43425 |
| #4 | −0.775 | 0.647 | | | |
| #5 | ∞ | 0.200 | 1.51900 | 64.1 | 1.51633 |
| #6 | ∞ | — | | | |

TABLE 16

| | #3 | #4 |
|---|---|---|
| K | 0.0000E+00 | 0.0000E+00 |
| A4 | −0.63142E+00 | 0.63142E+00 |
| A6 | 0.39139E+01 | −0.39139E+01 |
| A8 | −0.32962E+02 | 0.32962E+02 |
| A10 | 0.0000E+00 | 0.0000E+00 |
| A12 | 0.0000E+00 | 0.0000E+00 |

Similarly to the objective lenses L3 and L4, the objective lens L5 is configured such that not only surfaces r3 (#3) and r4 (#4) are symmetrical with respect to a plane perpendicular to an optical axis of the objective lens L5, but also the field angles for the beam entering from the incident surface r3 and for the beam entering from the exit surface r4 are equal to each other. Further, the entrance pupils for the beam entering from the incident surface r3 (#3) and for the beam entering from the exit surface r4 (#4) are equal to each other. As indicated in TABLE 15, the objective lens L5 has the F number (FNO) of 1:3.3, a focus length (f) of 1.00 mm, a field angle (W) of 8.6 degree, and the numerical aperture (NA) of 0.15 with regard to both of the beam entering from the surfaces r3 and the beam entering from the surface r4.

As shown in TABLE 15, the objective lens L5 achieves a wide field angle, and therefore the objective lens L5 enables to detect the hologram information from the hologram disc with high accuracy.

Figure 43:
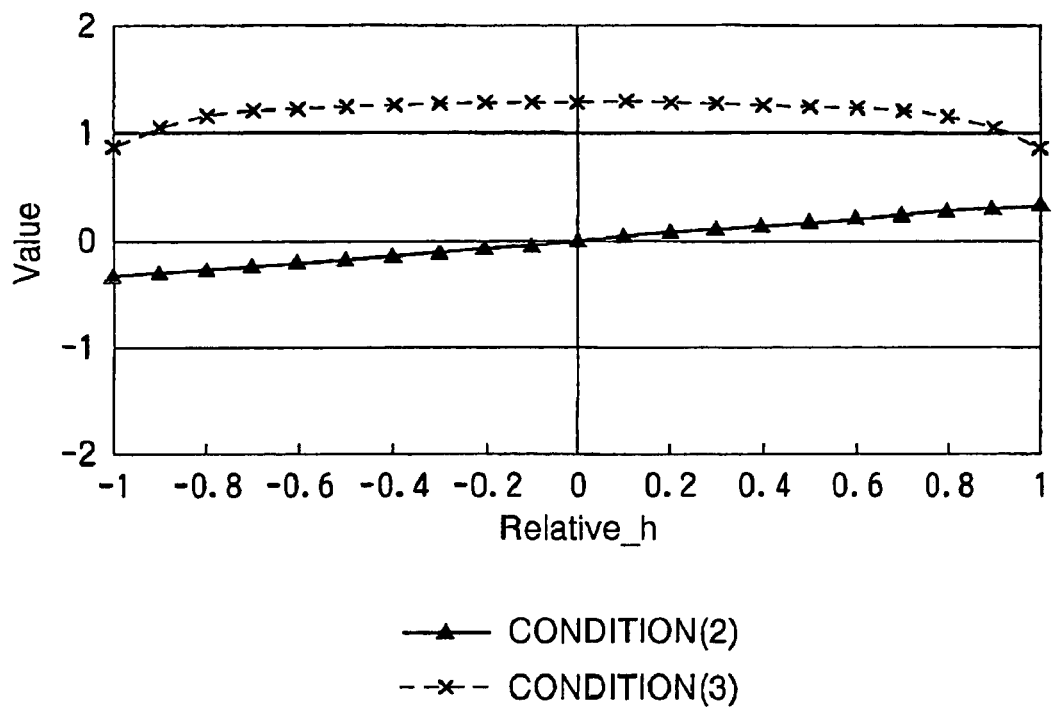
FIG. 43 is a graph illustrating values of the conditions (2) and (3) of the fifth example.

FIG. 43 is a graph illustrating values of the conditions (2) and (3) which define the shape of the surface r3 (r4) of the objective lens L5. TABLE 17 shows numerical data of the formula (1) and the conditions (2) and (3) regarding the fifth example. Since the surface r3 (#3) and the surface r4 (#4) have the same shape, both of the surfaces r3 and r4 take numerical data indicated in TABLE 17.

TABLE 17

| | | Surface #3 (#4) | | |
|---|---|---|---|---|
| Relative h | h [mm] | formula (1) F(h) | Condition(2) dF(h)/dh | Condition(3) $d^2F(h)/d^2h$ |
| 1 | 0.276 | 5.088E−02 | 0.33339 | 0.86932 |
| 0.9 | 0.2484 | 4.092E−02 | 0.30642 | 1.06374 |
| 0.8 | 0.2208 | 3.213E−02 | 0.27556 | 1.16055 |
| 0.7 | 0.1932 | 2.447E−02 | 0.24284 | 1.20521 |
| 0.6 | 0.1656 | 1.790E−02 | 0.20925 | 1.22624 |
| 0.5 | 0.138 | 1.238E−02 | 0.17522 | 1.23954 |
| 0.4 | 0.1104 | 7.903E−03 | 0.14083 | 1.25217 |
| 0.3 | 0.0828 | 4.435E−03 | 0.10609 | 1.26552 |
| 0.2 | 0.0552 | 1.968E−03 | 0.07098 | 1.27797 |
| 0.1 | 0.0276 | 4.915E−04 | 0.03558 | 1.28689 |
| 0 | 0 | 0 | 0 | 1.29014 |
| −0.1 | −0.0276 | 4.915E−04 | −0.03558 | 1.28689 |
| −0.2 | −0.0552 | 1.968E−03 | −0.07098 | 1.27797 |
| −0.3 | −0.0828 | 4.435E−03 | −0.10609 | 1.26552 |
| −0.4 | −0.1104 | 7.903E−03 | −0.14083 | 1.25217 |
| −0.5 | −0.138 | 1.238E−02 | −0.17522 | 1.23954 |
| −0.6 | −0.1656 | 1.790E−02 | −0.20925 | 1.22624 |
| −0.7 | −0.1932 | 2.447E−02 | −0.24284 | 1.20521 |
| −0.8 | −0.2208 | 3.213E−02 | −0.27556 | 1.16055 |
| −0.9 | −0.2484 | 4.092E−02 | −0.30642 | 1.06374 |
| −1 | −0.276 | 5.008E−02 | −0.33339 | 0.86932 |

Figure 44:
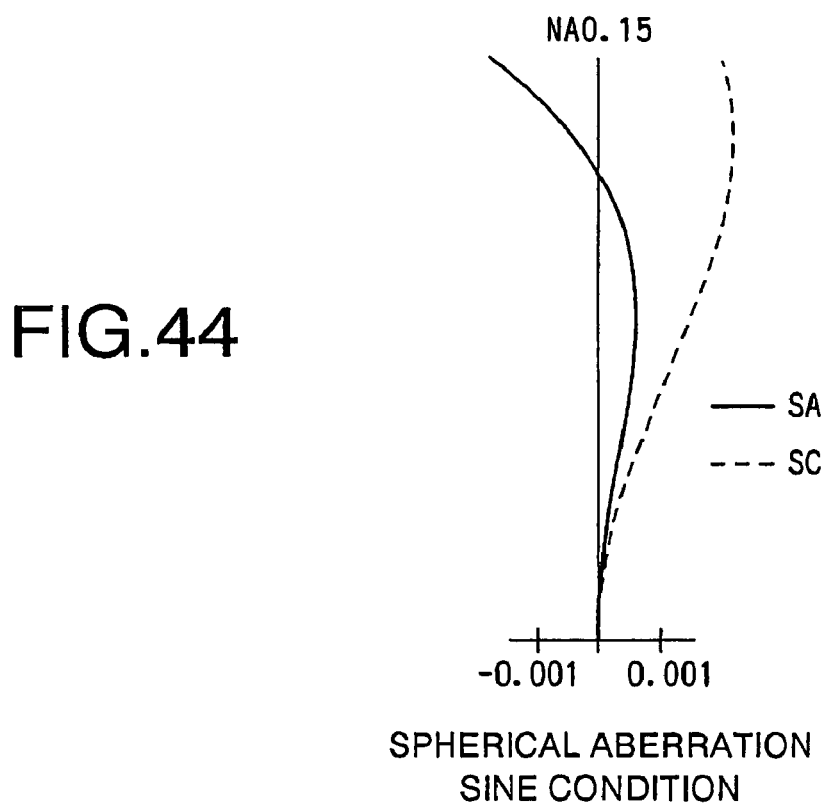
FIG. 44 is a graph showing the spherical aberration and the sine condition of the objective lens of the fifth example.
Figure 45:
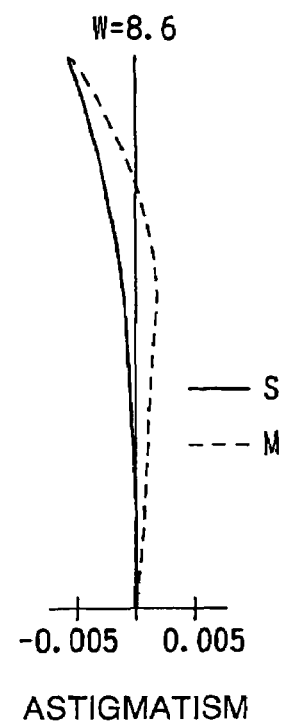
FIG. 45 is a graph showing astigmatism of the objective lens of the fifth example.
Figure 46A:
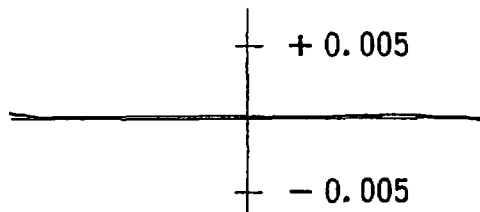
FIGS. 46A-46D are graphs showing transverse aberrations of the objective lens of the fifth example.
Figure 46B:
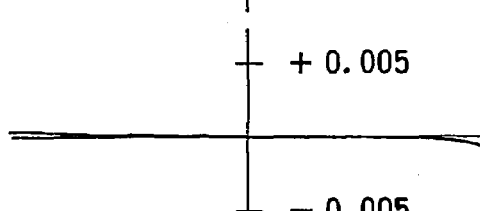
Figure 46C:
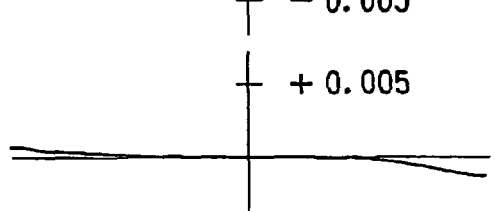
Figure 46D:
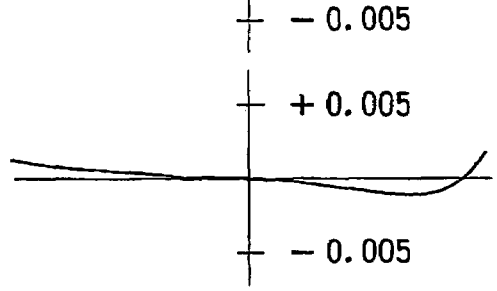

FIG. 44 is a graph showing the spherical aberration and the sine condition of the objective lens L5. FIG. 45 is a graph showing astigmatism of the objective lens L5.

FIGS. 46A-46D are graphs showing transverse aberrations of the objective lens L5. FIGS. 47A-47D are graphs showing the wavefront aberrations of the objective lens L5. In FIGS. 46A-46D (and in FIGS. 47A-47D), aberrations with respect to the beam having wavelength of 532 nm at the image heights y of 0.00, 0.05, 0.10 and 0.15 (mm) are indicated, respectively. The image heights y of 0.05 mm, 0.10 mm and 0.15 mm correspond to the field angles W [degree] of 2.9, 5.8 and 8.6, respectively. The field angle of 8.6 degree is the maximum field angle.

FIG. 48 is a graph showing a relationship between an RMS value of the wavefront aberration and the field angle. Similarly to FIG. 13, FIG. 49 is a graph showing the f sin W characteristic of the objective lens L5.

As can be seen from FIG. 43 and TABLE 17, the objective lens L5 of the fifth example satisfies the conditions (2) and (3). Further, the objective lens L5 takes r/tc of 1.371, and therefore the objective lens L5 satisfies the condition (4). As can be seen from FIGS. 44-47D, the aberrations are sufficiently corrected.

As can be seen from FIG. 48, the RMS value of the wavefront aberration is suppressed lower than or equal to Marechal criterion within the maximum field angle with regard to both of the beams entering from the surfaces r3 and r4.

Figure 49:
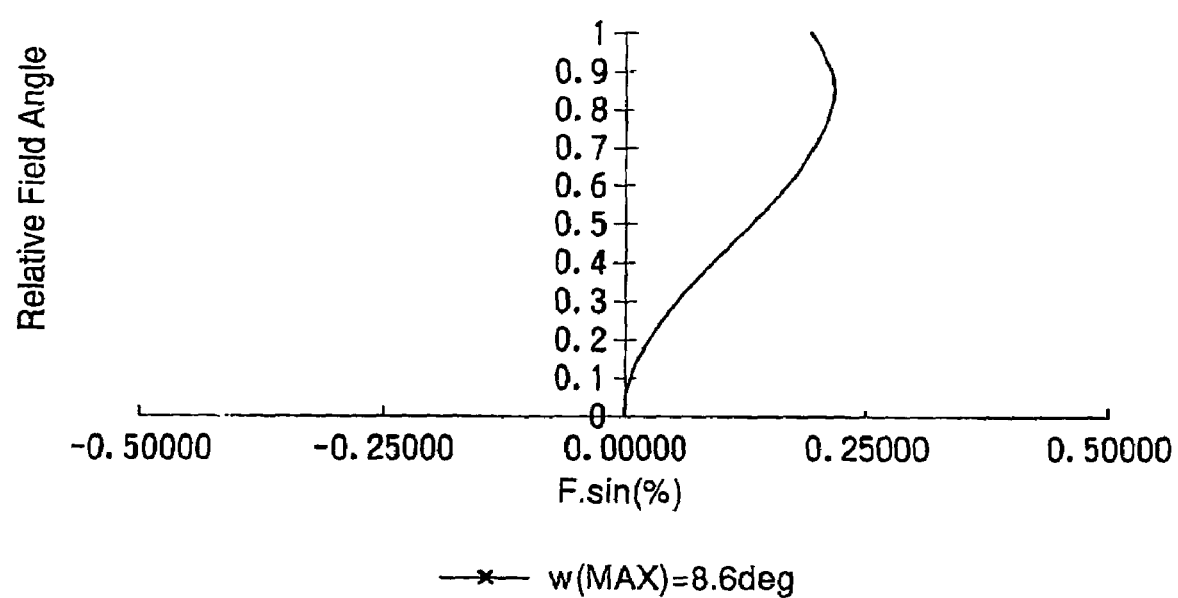
FIG. 49 is a graph showing the f sin W characteristic of the objective lens of the fifth example.

As can be seen from FIG. 49, the f sin W characteristic used as a measure for an evaluation of optical performance of the fourier transform lens is excellent.

As described above, although the objective lens L5 is configured as a single lens, the objective lens L5 has sufficiently corrected aberrations and has high performance as the fourier transform lens. Accordingly, the objective lens L5 is suitable for recording/reproducing information to/from the hologram disc.

As described above, according to the embodiment of the present invention, an objective lens which consists of a single lens having sufficiently suppressed aberrations and which has the function of the fourier transform lens is provided.

Since the objective lens according to the invention is configured to be a single lens, structures and techniques adopted in the conventional optical recording/reproducing apparatus using a single element objective lens can be utilized to configure the optical recording/reproducing device for hologram disc.

In particular, the objective lens according to the invention can relatively easily be mounted on the conventional optical pick-up adopted in the conventional optical recording/reproducing apparatus. Therefore, cost and time required for development and manufacture of the optical recording/reproducing device for hologram disc can be reduced.

Further, the incident and exit surfaces of the objective lens according to the embodiment of the invention have the same shape. Therefore, the objective lens according to the invention has the following advantageous. Cost of a mold of the objective lens can be reduced. The objective lens can be mounted on the optical recording/reproducing device during manufacturing process with disregard to orientation of the objective lens. There is no necessity of adjustment with regard to decentering of lenses constituting an objective lens in contrast to the conventional fourier transform lens consisting of a plurality of lenses disclosed in the above mentioned publication HEI11-133297. By arranging two or more objective lenses according to the invention so that the objective lenses are opposed to each other, a various types of relay lens systems having various magnifications can be accomplished.

Although the present invention has been described in considerable detail with reference to certain preferred embodiments thereof, other embodiments are possible.

The present disclosure relates to the subject matter contained in Japanese Patent Application No. P2002-346730, filed on Nov. 29, 2002, which is expressly incorporated herein by reference in its entirety.

What is claimed is:

1. An objective lens for an optical recording/reproducing device which records/reproduces information to/from a recording medium utilizing holography, said objective lens converging a collimated beam in the vicinity of a recording surface of the recording medium to record/reproduce the information, said objective lens comprising:
   a single lens element having an incident surface to which the collimated beam enters and an exit surface being opposite to said incident surface;
   said incident surface and said exit surface being configured to be rotationally symmetrical aspherical surfaces;
   at least within an effective diameter of said single lens element, said incident surface and said exit surface being symmetrical with respect to a plane perpendicular to an optical axis of said single lens element and having the same shape;
   said single lens element having positive refractive power;
   wherein the rotationally symmetrical aspherical surface of each of said two refractive surfaces is expressed by a formula (1) below:

$$F(h) = \frac{\frac{h^2}{r}}{1+\sqrt{1-(1+K)\left(\frac{1}{r}\right)^2 h^2}} + A_4 h^4 + A_6 h^6 + A_8 h^8 + A_{10} h^{10} \quad (1)$$

where F(h) is a sag amount (i.e., a distance from a plane, which is tangential to the rotationally symmetrical aspherical surface at the optical axis, to the rotationally symmetrical aspherical surface at a position whose height with respect to the optical axis is h), r is a radius of curvature of the rotationally symmetrical aspherical surface at the optical axis, K is a conical coefficient, and $A_4$-$A_{10}$ are fourth, sixth, eighth, and tenth order aspherical coefficients, respectively, wherein a first derivative of the sag amount F(h) with respect to h satisfies a condition (2) and a second derivative of the sag amount F(h) with respect to h satisfies a condition (3):

$$-0.35 \leq dF(h)/dh \leq +0.35 \quad (2)$$

$$+0.3 \leq d^2 F(h)/d^2 h \leq +1.3 \quad (3).$$

2. The objective lens according to claim 1, wherein said objective lens satisfies a condition (4):

$$0.9 \leq r/tc \leq 1.5 \quad (4)$$

where r represents the radius of curvature on the optical axis, and tc represents a central lens thickness of said objective lens.

3. The objective lens according to claim 1, wherein an image height y of an image formed by said objective lens is defined by the following equation (5):

$$y = f \sin W \quad (5)$$

where f represents a focal length of said objective lens and W represents a field angle, wherein, with regard to each of a beam entering from said incident surface and a beam entering from said exit surface, an entrance pupil plane coincides with a front focal point and an image point coincides with a back focal point.

4. The objective lens according to claim 1, wherein, with regard to each of a beam entering from said incident surface and a beam entering from said exit surface, said objective lens has wavefront aberration performance less than or equal to Marechal criterion within a maximum field angle range.

5. The objective lens according to claim 4, wherein half of the maximum field angle is larger than or equal to 3°.

\* \* \* \* \*